(12) United States Patent
Kang et al.

(10) Patent No.: US 8,480,022 B2
(45) Date of Patent: Jul. 9, 2013

(54) FLY REEL SPOOL

(76) Inventors: Seok Woon Kang, Incheon (KR); Suk Young Kang, Incheon (KR)

(*) Notice: Subject to any disclaimer, the term of this patent is extended or adjusted under 35 U.S.C. 154(b) by 933 days.

(21) Appl. No.: 12/573,410

(22) Filed: Oct. 5, 2009

(65) Prior Publication Data

US 2010/0181406 A1    Jul. 22, 2010

(30) Foreign Application Priority Data

| Jan. 22, 2009 | (KR) | 10-2009-0005635 |
| Jan. 22, 2009 | (KR) | 10-2009-0005637 |
| Mar. 17, 2009 | (KR) | 10-2009-0022646 |
| Mar. 17, 2009 | (KR) | 10-2009-0022647 |
| Mar. 17, 2009 | (KR) | 10-2009-0022648 |

(51) Int. Cl.
    *A01K 89/01*      (2006.01)

(52) U.S. Cl.
    USPC .......................... 242/318; 242/317

(58) Field of Classification Search
    USPC ................... 242/317, 318, 310, 312
    See application file for complete search history.

(56) References Cited

U.S. PATENT DOCUMENTS

| 3,478,976 | A | * | 11/1969 | Sarah | 242/270 |
| 3,478,977 | A | * | 11/1969 | Sarah | 242/270 |
| 3,561,695 | A | * | 2/1971 | Wood, Jr. | 242/250 |
| 4,715,555 | A | * | 12/1987 | McChristian, Jr. | 242/295 |
| 4,750,687 | A | * | 6/1988 | Sievert et al. | 242/295 |
| 5,120,003 | A | * | 6/1992 | Sacconi | 242/317 |
| 5,609,309 | A | * | 3/1997 | Oh | 242/282 |
| 6,065,699 | A | * | 5/2000 | Sacconi | 242/286 |
| 6,206,312 | B1 | * | 3/2001 | Oh | 242/314 |
| 6,382,544 | B1 | * | 5/2002 | Park | 242/303 |
| 7,431,232 | B1 | * | 10/2008 | Kang | 242/303 |

* cited by examiner

*Primary Examiner* — Emmanuel M Marcelo
(74) *Attorney, Agent, or Firm* — Cantor Colburn LLP

(57) ABSTRACT

A fly reel spool rotatably coupled with a frame mounted on a fishing rod to wind a fish line includes a rotary frame rotatably coupled inside the frame; a winding drum having a ball-catching protrusion on an inner circumference coupling with the rotary frame, the winding drum configured such that the fish line is wound on or unwound from an outer circumference; a locking ball installed in an outer circumference of the rotary frame to protrude from and retract into the rotary frame; elastic means for elastically holding the locking ball so that it protrudes from the outer circumference of the rotary frame, whereby the locking ball is caught by one touch on the ball-catching protrusion on the inner circumference of the winding drum when the rotary frame is coupled with the winding drum, and stopping means for supporting the winding drum and the rotary frame to rotate together.

10 Claims, 29 Drawing Sheets

FLY REEL SPOOL

BACKGROUND OF THE INVENTION

1. Field of the Invention

The present invention relates, in general, to a fly reel spool and, more particularly, to a fly reel spool which is advantageous for consumers in terms of cost savings since main parts for winding or unwinding a fish line such as a rotary frame and a winding drum can be separated from each other, and to a fly reel having this spool.

2. Description of the Related Art

Fly fishing is a method of fishing for bass, trout, etc., which feed on water insects or small fish. Fly fishing uses a fly hook resembling the shape of an aquatic insect made of a bird feather or animal hair to lure fish to bite the fly hook.

A fly reel of a fly fishing rod includes, as main parts, a spool for winding or unwinding a fish line, a frame rotatably supporting the spool and a bearing set (including a one-way bearing) for controlling the rotating rate of the spool. The fish line can be rapidly wound on the spool by turning a handle attached to the spool. Conversely, the rate of unwinding the fish line from the spool can be controlled by the one-way bearing in the bearing set.

A spool part for winding the fish line on the fly reel is fabricated and distributed as an integral unit including a handle rim to which the handle is rotatably coupled and a winding drum on which the fish line is directly wound. Since fly reels are an expensive article, it would be advantageous for consumers who like fly fishing in terms of cost if they could purchase only a winding drum to use together with a fly reel which had been purchased before.

However, products satisfying such demands have not yet been distributed.

SUMMARY OF THE INVENTION

The present invention has been made to solve the foregoing problems with the prior art, and therefore the present invention provides a fly reel spool that is advantageous in terms of cost and is convenient to use since consumers can purchase only a winding drum, on which a fish line is directly wound, to use together with a fly reel, which had been purchased before.

The present invention also provides a fly reel spool that can efficiently operate with high reliability since main parts detachably supporting a rotary frame and a winding drum can be more easily assembled and have a more stable structure.

According to an aspect of the present invention, the fly reel spool rotatably coupled with a frame mounted on a fishing rod to wind a fish line may include a rotary frame rotatably coupled inside the frame; a winding drum having a ball-catching protrusion on an inner circumference thereof coupling with the rotary frame, wherein the winding drum is configured such that the fish line is wound on or unwound from an outer circumference thereof; a locking ball installed in an outer circumference of the rotary frame to protrude from and retract into the rotary frame; elastic means for elastically holding the locking ball so that the locking ball protrudes from the outer circumference of the rotary frame, whereby the locking ball is caught by one touch on the ball-catching protrusion on the inner circumference of the winding drum when the rotary frame is coupled with the winding drum, and stopping means for supporting the winding drum and the rotary frame to rotate together.

According to embodiments of the present invention, a part of the fly reel on or from which the fish line is wound or unwound is constructed with the rotary frame and the winding drum, which are attached to and detached from each other by one touch, so that the winding drum of the fly reel on which the fish line is directly wound can be separately purchased to reduce the purchase price for consumers. This is desirable for consumers in terms of cost. Since the fly reel is a type of high grade leisure article, its price is high. In this embodiment of the present invention, since the winding drum on which the fish line is directly wound can be separately purchased, the consumers can experience a significant cost saving effect. Due to these features, a positive response from the consumers can be expected.

In addition, the rotary frame and the winding drum are securely coupled with each other by the locking balls in the locked position, and the elastic sheet made of elastic material such as silicone is installed inside the housing from and into which the locking balls can protrude and retract so as to elastically hold the locking balls. Thereby, the fly reel spool can efficiently operate with high reliability since the main parts detachably supporting the rotary frame and the winding drum can be more easily assembled and have a more stable structure.

According to embodiments of the invention, the winding drum is coupled by one touch to the rotary frame (i.e., a main part) using the locking members, and the annular spring fitted into the inner circumference of the winding drum using its own elastic force elastically holds the locking members in the locked position. The locking part can be improved to have a simpler structure, and a more rapid assembly operation can be expected.

According to embodiments of the invention, the locking members are formed in the rotary frame, the locking protrusions are formed in the locking members, and the ball-catching protrusion is formed on the winding drum, such that the winding drum and the rotary frame are securely coupled with each other by engagement between the locking members of the rotary frame and the ball-catching protrusion. Thereby, the main parts detachably supporting the rotary frame and the winding drum can be more easily assembled and have a more stable structure.

In addition, the main part detachably supporting the rotary frame and the winding drum is implemented with the wire spring produced by bending a single wire, and the elastic bends of the wire spring are caught on the ball-catching protrusion on the inner circumference of the winding drum. Thereby, the main part can be realized with a simpler structure.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF THE INVENTION

The present invention will now be described more fully hereinafter with reference to the accompanying drawings, in which exemplary embodiments thereof are shown.

Figure 1:
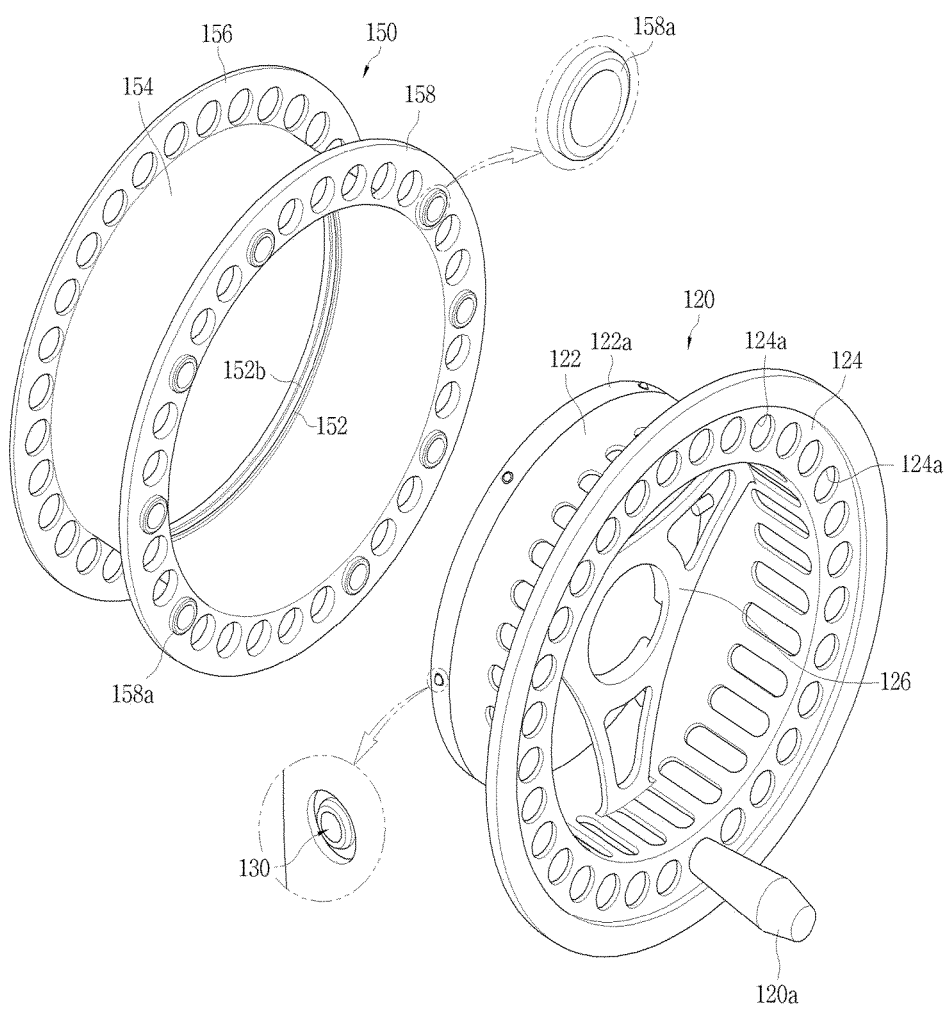
FIG. 1 is an exploded perspective view illustrating a spool according to an exemplary embodiment of the present invention.
Figure 2:
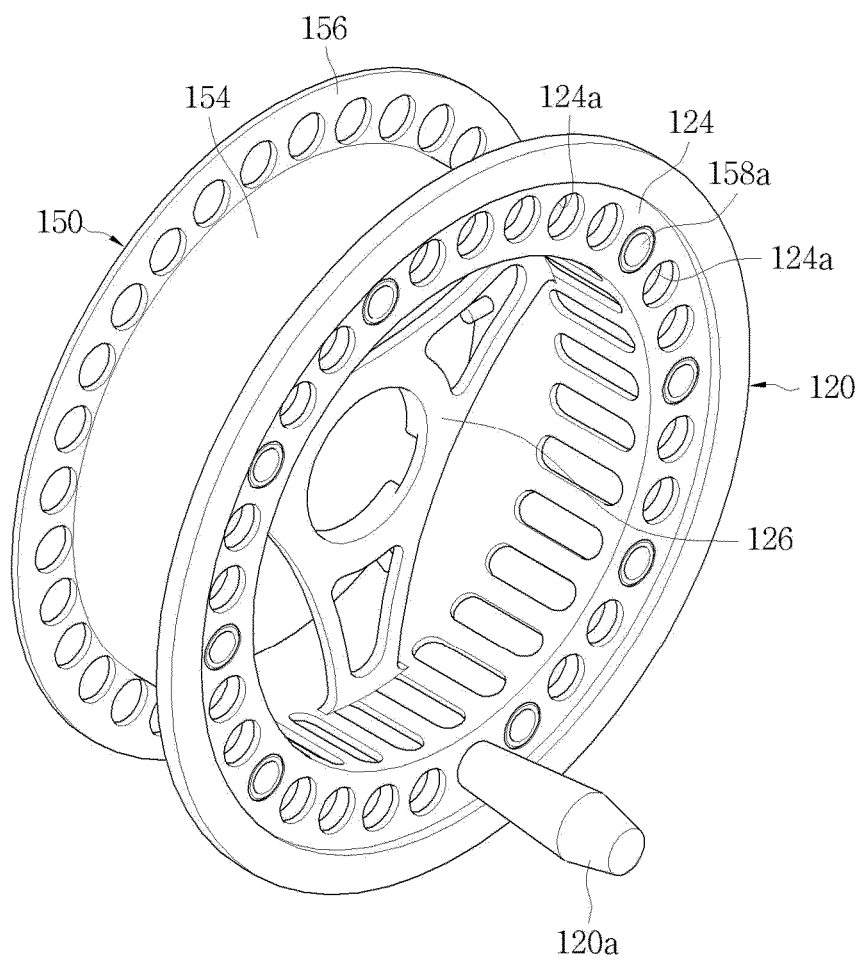
FIG. 2 is an assembled perspective view of the spool shown in FIG. 1.
Figure 3:
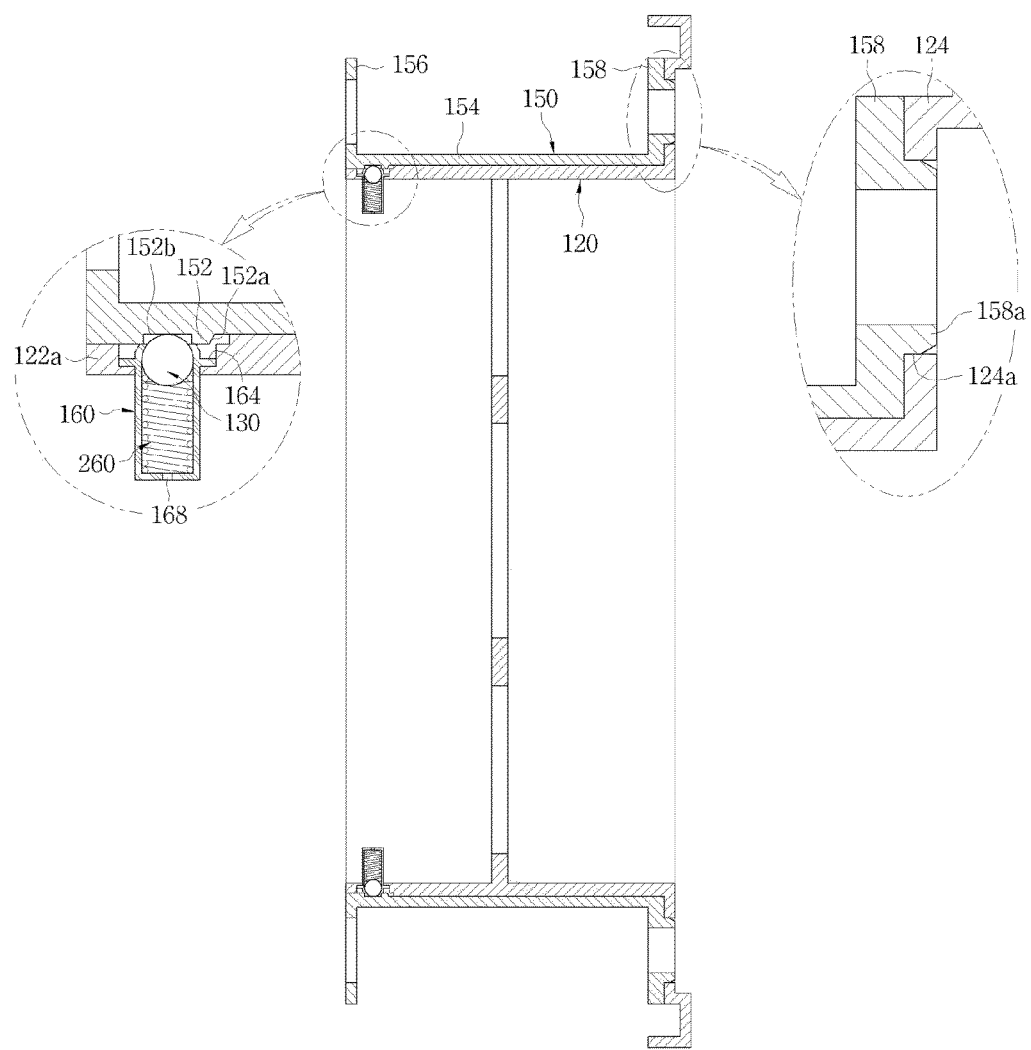
FIG. 3 is a cross-sectional view illustrating main parts of the spool shown in FIG. 1.
Figure 4:
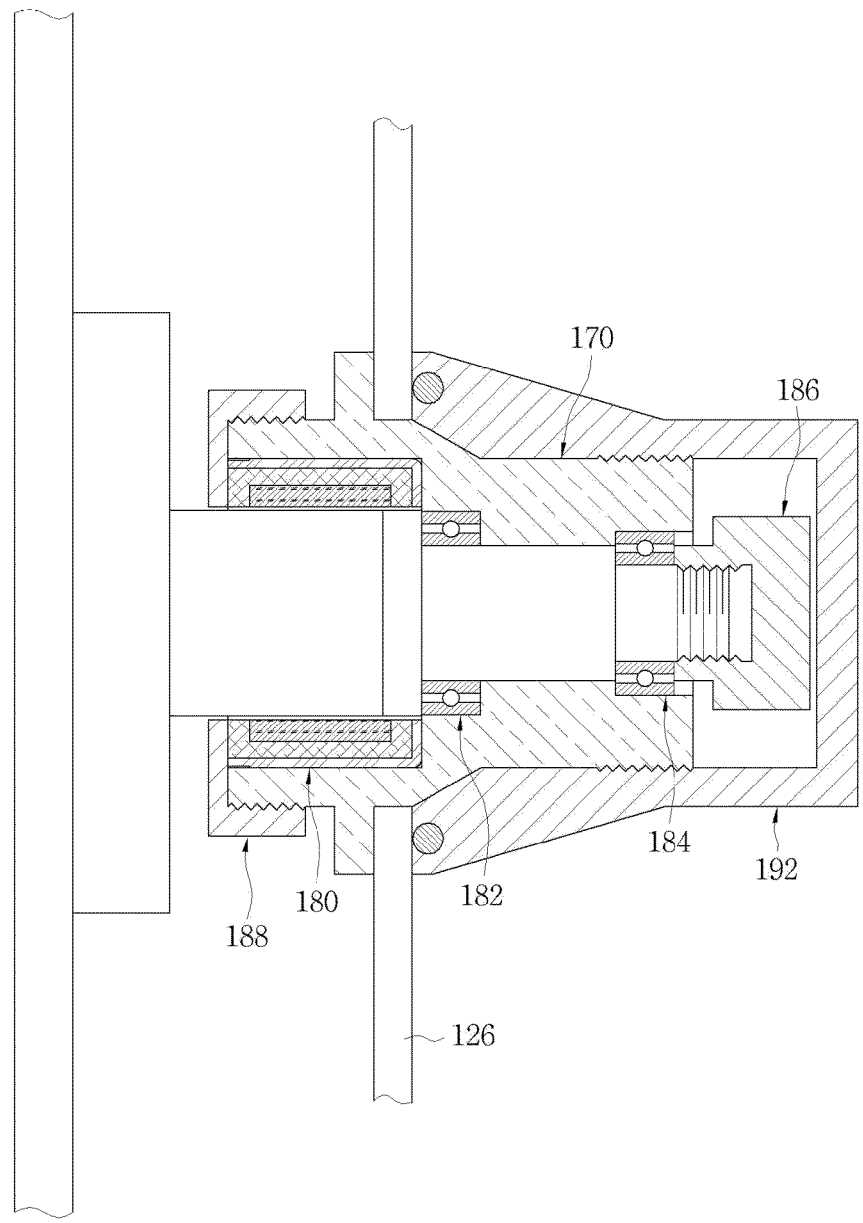
FIG. 4 is a cross-sectional view illustrating the structure of a drag unit of the spool shown in FIG. 1.
Figure 5:
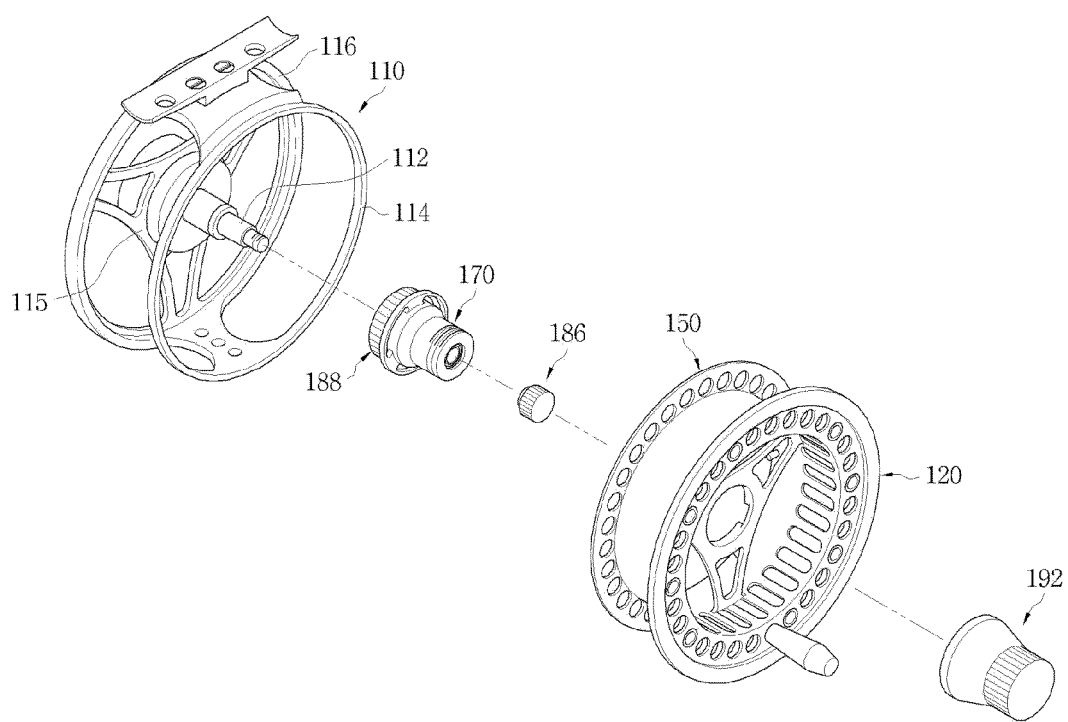
FIG. 5 is an exploded perspective view illustrating a fly reel having the spool shown in FIG. 1.

FIG. 1 is an exploded perspective view illustrating a spool according to an exemplary embodiment of the present invention, FIG. 2 is an assembled perspective view of the spool shown in FIG. 1, FIG. 3 is a cross-sectional view illustrating main parts of the spool shown in FIG. 1, FIG. 4 is a cross-sectional view illustrating the structure of a drag unit of the spool shown in FIG. 1, and FIG. 5 is an exploded perspective view illustrating a fly reel having the spool shown in FIG. 1.

As shown in the figures, the present invention includes a rotary frame 120, a winding drum 150, locking balls 130 and elastic supporting means. The rotary frame 120 is rotatably mounted inside a cylindrical frame 110, which has a shaft member 112 in the central portion thereof, via a drag unit, and the winding drum 150 is detachably coupled with the rotary frame 120. The locking balls 130 support the winding drum 150 so as not to escape from the rotary frame 120, and the elastic supporting means elastically push the locking balls 130. FIGS. 1 and 3 show a coil spring 260 used as the elastic supporting means.

As shown in FIG. 5, the frame 110 has a cylindrical shape having two annular rims 114 and 116 to which reinforcing pieces are integrally fixed. A plurality of segments 115 are integrally provided in the inner circumference of the rim 116 of the two annular rims 114 and 116, and a shaft member 112 is provided in the central portion of the segments 115.

The rotary frame 120 is configured to have a flange 124 extending radially outwards from the outer circumference of a cylindrical portion 122. In addition, a plurality of spokes 126 are radially provided on the inner circumference of the cylindrical portion 122 of the rotary frame 120, and a coupling hole is formed in the central portion of the spokes 126. The coupling hole is configured such that drag housings 160 and 170, main components of the drag unit, are fitted into the coupling hole. A plurality of keys protruding from the spokes 126 around the coupling hole are engaged into keyholes in the edge of the drag housing 170, a main component of the drag unit, such that the rotary frame 120 is coupled on the circumference of the drag unit so as not to skid. Of course, the drag unit is coupled with the shaft member 112 of the frame 110, such that the rotary frame 120 can rotate with respect to the frame 110 fixed to a fishing rod as the drag unit rotates on the circumstance of the shaft member 112 of the frame 110. While this embodiment has been described as the rotary frame 120 coupled to rotate together with the drag unit through the engagement between the keys and the keyholes, it should be understood that any known means can also be used as long as they can couple the drag unit and the rotary frame 120 so that they rotate together.

As shown in FIG. 4, the drag unit includes the drag housing 170, bearings 180, 182 and 184 inside the drag housing 170, a cap nut 186, a spool cap 192 and a retainer 188. The bearings 180, 182 and 184 include a main bearing 180, a one-way bearing 182 and an auxiliary bearing 184.

In the meantime, it should be understood that the drag unit supporting the rotary frame 120, the main component of the present invention, to be rotatable with respect to the frame 110 mounted on the fishing rod, can be implemented with a known structure other than the above-described structure.

In addition, the frame 110 extending radially outwards from the outer circumference of the rotary frame 120 is provided with a plurality of stop holes 124a in the circumferential direction. The reference number 120a designates a handle that a user holds with the hand while fly fishing.

In addition, the rotary frame 120 has a locking ball coupling portion 122a extending radially in one end side (i.e., an inner end side), opposite the other end where the flange 124 is formed in the outer circumference of the cylindrical portion 122. The locking ball coupling portion 122a adjoining the other portions at a stepped portion has a relatively smaller thickness than the other portions do. The locking ball coupling portion 122a also has through-holes 123a at regular intervals in the circumferential direction.

The winding drum 150 has a cylindrical rim 154, and an inner end flange 156 and an outer end flange 158, in which the inner and outer end flanges 156 and 185 extend radially outwards from inner and outer ends of the rim 154, respectively. The cylindrical rim 154 of the winding drum 150 is coupled with the outer circumference of the cylindrical portion 122 of the rotary frame 120, such that the rotary frame 120 and the winding drum 150 can be coupled with each other.

The winding drum 150 has a ball-catching protrusion 152 configured to catch thereon the locking balls 130, which will be described later. Specifically, the cylindrical rim 154 of the winding drum 150 has the annular ball-catching protrusion 152 radially extending in the inner circumference thereof, adjacent to the inner end flange 156. In FIG. 3, the ball-catching protrusion 152 is shown in an enlarged cross-sectional view. The ball-catching protrusion 152 also has a catch guide 152a on a surface portion, which is configured to come into contact with the locking ball 130, which will be described later. The catch guide 152a is inclined towards the inner side (i.e., in the direction facing the segments 115 of the frame 110 of the fishing rod). A concave locking groove 152b is also formed in one portion of the ball-catching protrusion 152 (in a position opposite the catch guide 152a), such that the locking ball 130 can be inserted into the locking groove 152b.

In addition, a plurality of stop protrusions 158a are radially formed in the outer end flange 158 of the cylindrical rim 154 of the winding drum 150 and a plurality of stop holes 124a are radially formed in the flange 124 of the rotary frame 120, opposite the outer end flange 158. In this embodiment of the present invention, a plurality of the annular stop protrusions 158a are formed in the outer end flange 158 of the winding drum 150.

The winding drum 150 is detachably coupled with the rotary frame 120 via the locking balls 130. Specifically, the winding drum 150 can be attached to and detached from the rotary frame 120 by one touch. Referring to FIG. 3, the housing 160 is fitted into the through-hole 123a of each locking ball coupling portion 122a of the rotary frame 120, and each locking ball 130 is elevatably installed inside the housing 160. In this embodiment of the present invention, the locking ball 130 is installed to protrude from and retract into the upper end of the housing 160.

The locking ball 130 is elastically held on the upper end of the housing 160 by elastic supporting means, thereby protruding from the outer circumference of the rotary frame 120 through the through-hole 123a of the rotary frame 120. In this embodiment of the present invention, the elastic supporting means include a coil spring 260, which is interposed between the locking ball 130 and the inner space of the housing 160. In a resting position, the spring 260 elastically holds the locking ball 130 to elastically protrude from the outer circumference of the cylindrical portion 122 of the frame 120 through the through-hole 123a. Since the thickness of the locking ball coupling portion 122a of the rotary frame 120 is smaller than the other portions of the locking ball coupling portion 122a, the upper end of the locking ball 130 protruding from the upper end of the housing 160 is at the same level as the top surface of the other portions.

In addition, since the diameter of the housing 160 is greater than that of the through-hole 123a of the rotary frame 120, the housing 160 is press-fitted into the through-hole 123a of the rotary frame 120 and thereby is not easily separated therefrom. The housing 160 can be fixed to the through-hole 123a of the rotary frame 120 by fixing means. The fixing means can be implemented with adhesive and the like.

A catch protrusion (not shown) is also formed to radially extend from the circumference of the housing 160. The catch protrusion catches the inside wall of the through-hole 123a of the rotary frame 120, thereby preventing the housing 160 from being separated inwards from the rotary frame 120. In addition, the housing 160 also has an air hole 168 formed in the lower end thereof, which allows air to exit the housing 160 when the coil spring 260 is compressed. This as a result can facilitate an operation of compressing the coil spring 260.

The winding drum 150 can be rotated together with the rotary frame 120 by the stop holes 124a and the stop protrusions 158a as described above. Specifically, when the winding drum 150 is coupled with the rotary frame 120, the stop holes 124a and the stop protrusions 158a engage with each other. With this configuration, the winding drum 150 can rotate together with the rotary frame 120 without skidding when the rotary frame 120 rotates.

A guide slope can be formed in at least one of the stop hole 124a and the stop protrusion 158a. In this embodiment of the present invention, the guide slope is formed in the stop protrusion 158a. When the winding drum 150 is coupled with the rotary frame 120, the guide slope formed around the leading end of the stop protrusion 158a facilitates inserting the stop protrusion 158a into the stop hole 124a. Thereby, the winding drum 150 can be more easily coupled with the rotary frame 120.

According to this embodiment of the present invention having the above-described construction, when the cylindrical rim 154 of the winding drum 150 is aligned with and pushed into the cylindrical portion 122 of the rotary frame 120, the locking ball 130 protruding from the outer circumference of the cylindrical portion 122 of the rotary frame 120 is pressed by the ball-catching protrusion 152 protruding from the inner circumference of the rim 154 of the winding drum 150 to retract into the housing 160 and at the same time the coil spring 206 is compressed. The winding drum 150 continues to be pushed inwards until the ball-catching protrusion 152 passes completely beyond the locking ball 130. Then, the locking ball 130 is restored to its original position by an elastic repulsive force of the coil spring 260 and is caught by the ball-catching protrusion 152 of the winding drum 150. Thereby, the winding drum 150 is coupled with the rotary frame 120 without being separated therefrom. In other words, since the spherical locking ball 130 of the rotary frame 120 is caught by one touch on the ball-catching protrusion 152 in the inner circumference of the winding drum 150, the winding drum 150 can be attached to and detached from the rotary frame 120 by one touch.

A fly reel can be fabricated by coupling the above-described spool of this embodiment of the present invention, in which the winding drum 150 is coupled with the rotary frame 120, with the shaft member 112 of the central portion of the frame 110 mounted on the fishing rod via the above-described drag unit. Then, a user can enjoy fishing by attaching the fly reel fabricated as above to the fishing rod. For fly fishing, a fish line is of course wound on or unwound from around the cylindrical rim 154 of the winding drum 150.

According to this embodiment of the present invention, a part of the fly reel on or from which the fish line is wound or unwound is constructed with the rotary frame 120 and the winding drum 150, which are attached to and detached from each other by one touch, so that the winding drum 150 of the fly reel on which the fish line is directly wound can be separately purchased to reduce the purchase price for consumers. This is desirable for consumers in terms of cost. Since the fly reel is a type of high grade leisure article, its price is high. In this embodiment of the present invention, since the winding drum 150 on which the fish line is directly wound can be separately purchased, the consumers can experience a significant cost saving effect.

Here, the ball-catching protrusion 152 on the inner circumference of the cylindrical rim 154 of the winding drum 150 is further provided with the catch guide 152a. At the moment when the winding drum 150 is pushed into and coupled with the rotary frame 120, the inclined catch guide 152a of the ball-catching protrusion 152 more smoothly climbs over the spherical locking ball 130. Thereby, an operation of coupling the winding drum 150 can be more efficiently carried out.

In addition, the concave locking groove 152b is also formed in a portion of the ball-catching protrusion 152 (in a position opposite a portion where the catch guide 152a is formed). Since the spherical locking ball 130 is inserted into the concave locking groove 152b of the winding drum 150, an effect of enhancing the coupling force between the winding drum 150 and the rotary frame 120 can also be obtained.

The present invention also provides a fly reel including the rotary frame 120 and the winding drum 150 as described above. The fly reel of the present invention includes the frame 110, the rotary frame 120, the winding drum 150, the locking balls 130, the coil springs 206 as the elastic supporting means, and the stop protrusions 158a and the stop holes 124a. The frame 110 has the shaft member 112 in the central portion thereof, and the rotary frame 120 is rotatably mounted on the shaft member 112 of the frame 110 via the drag unit. The winding drum 150 is coupled with the rotary frame 120 with the ball-catching protrusion 152 formed in the inner circumference thereof and is configured such that a fish line can be wound on or unwound from the outer circumference thereof. The locking balls 130 can protrude from and retract into the outer circumference of the rotary frame 120. The coil springs 206 elastically hold the locking balls 130 to protrude from the outer circumference of the rotary frame 120 so that the locking balls 130 are caught by one touch on the ball-catching protrusion 152 on the inner circumference of the winding drum 150 when the rotary frame 120 is coupled with the winding drum 150. The stop protrusions 158a and the stop holes 124a support the winding drum 150 and the rotary frame 120 to rotate together. Of course, the rotary frame 120 and the winding drum 150 are detachably coupled with each other by the above-described structure, and a further description of that structure will be omitted.

Figure 6:
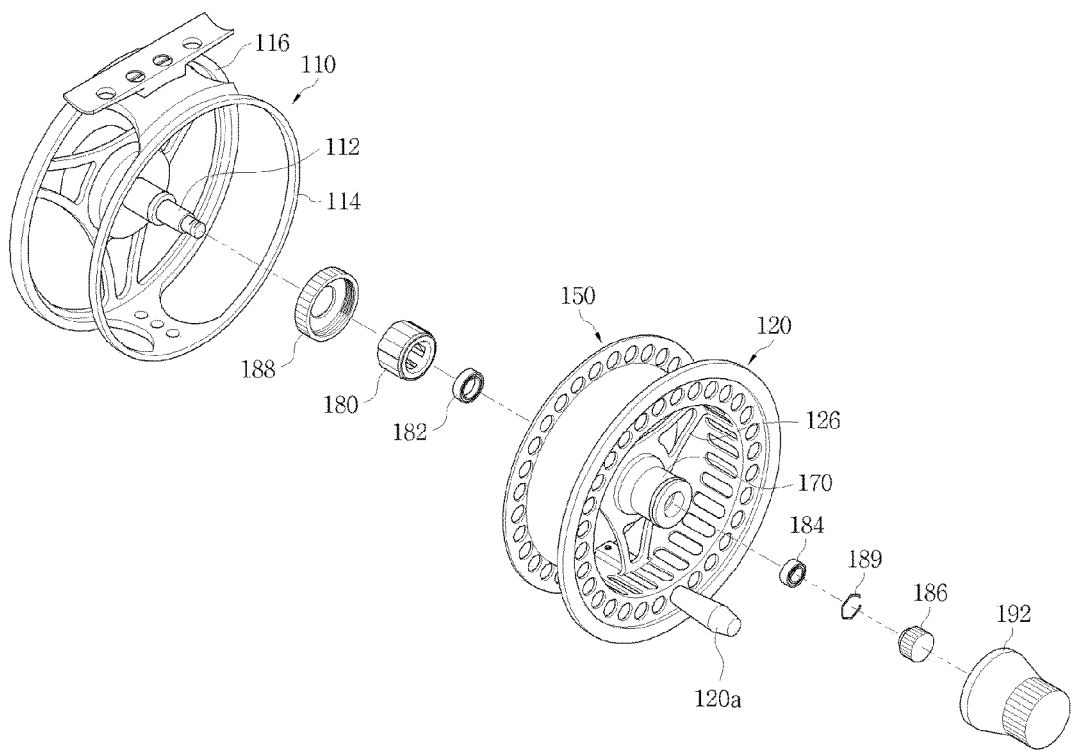
FIG. 6 is an exploded perspective view illustrating a fly reel having a spool according to another embodiment of the present invention.
Figure 7:
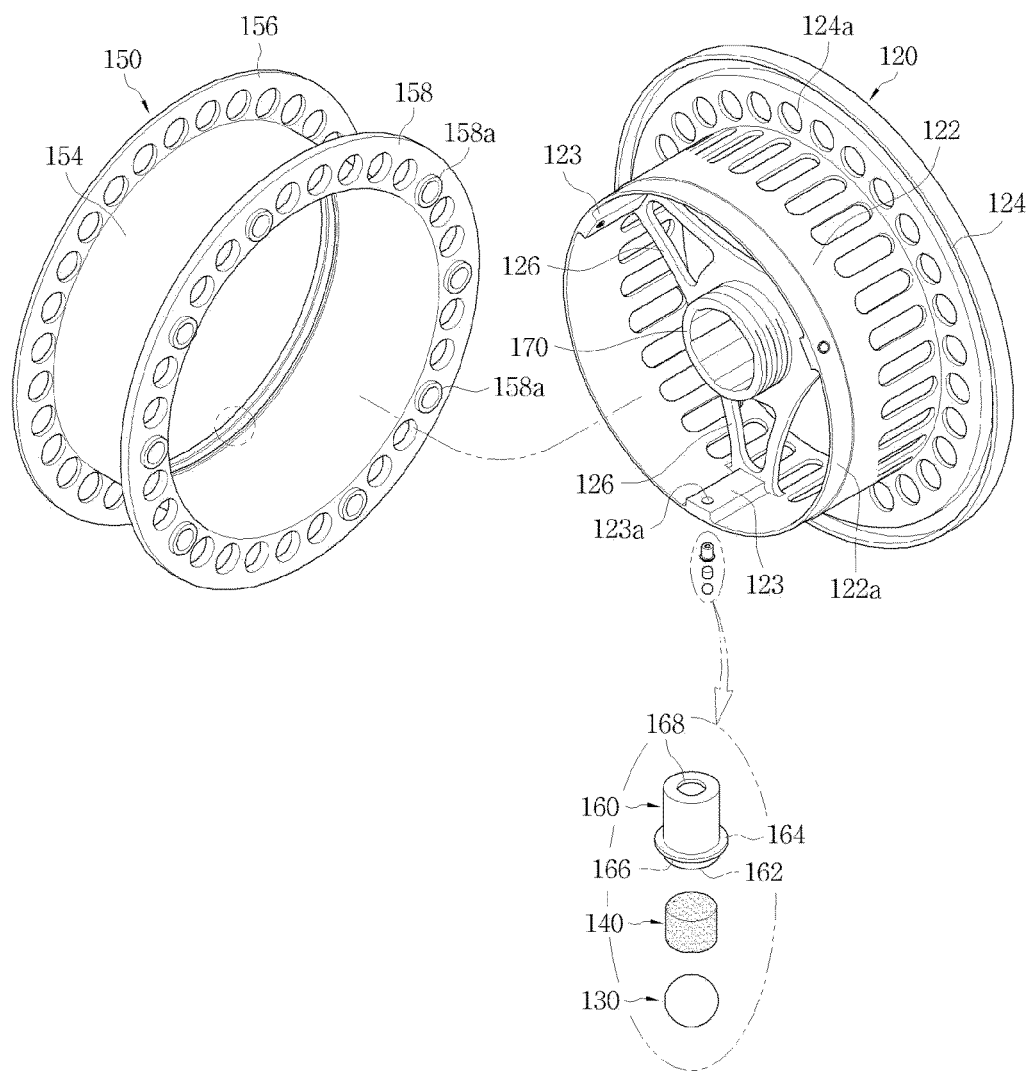
FIG. 7 is an exploded perspective view illustrating main parts such as a locking ball, an elastic sheet and a housing which are disassembled from the rotary frame of the spool shown in FIG. 6.
Figure 8:
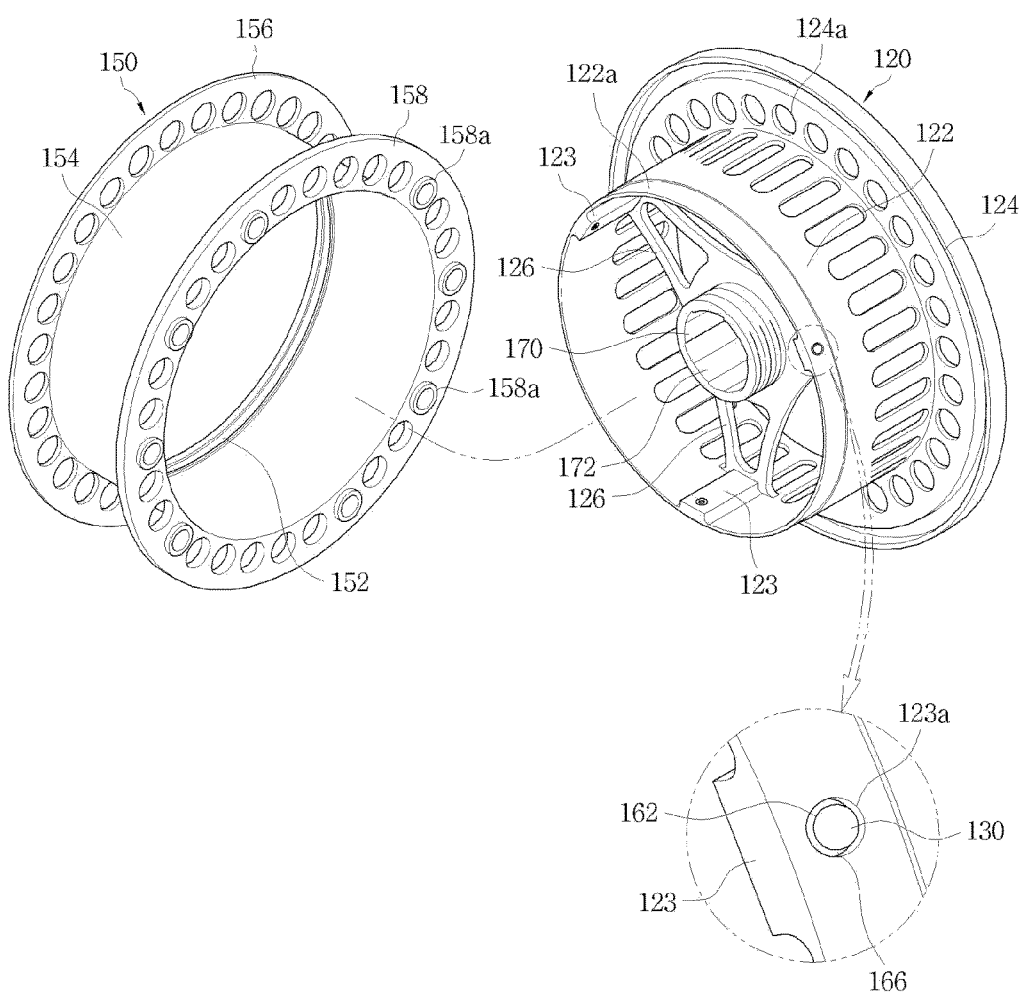
FIG. 8 is a perspective view of the main parts shown in FIG. 7, which are assembled to the rotary frame.
Figure 9:
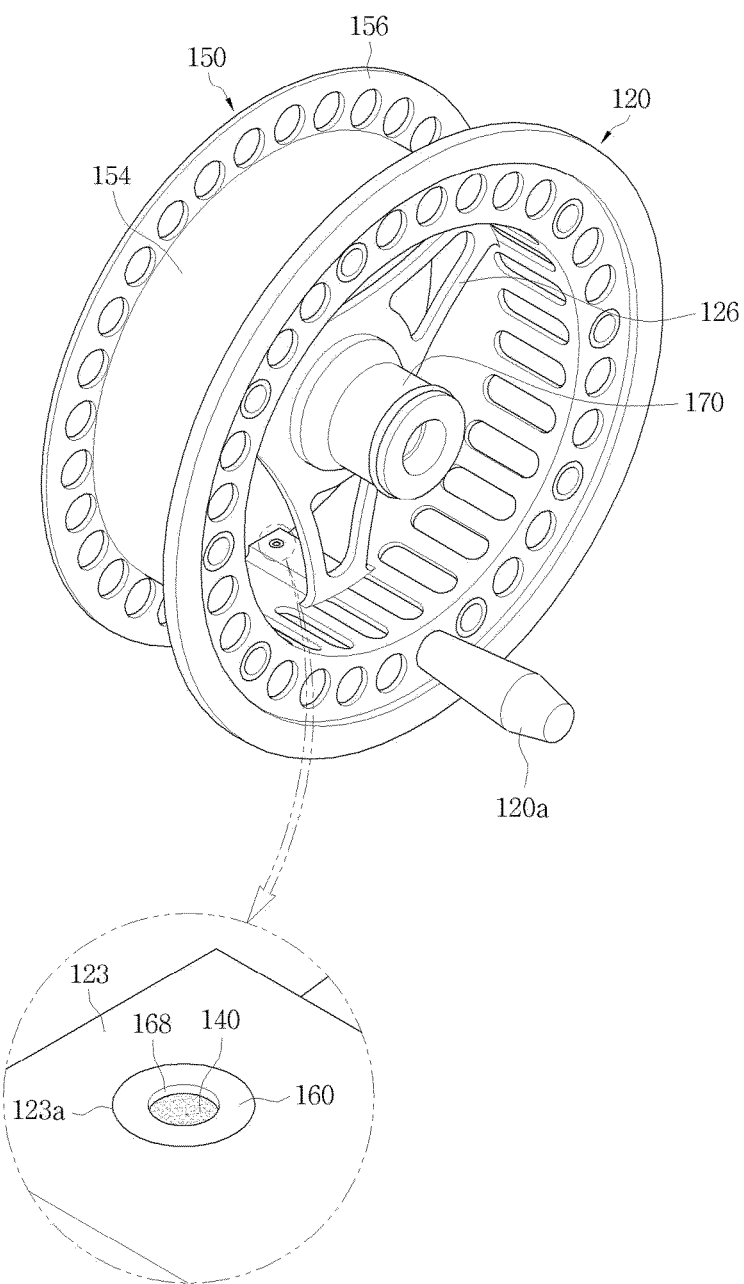
FIG. 9 is an assembled perspective view of the rotary frame and the winding drum shown in FIG. 8.
Figure 10:
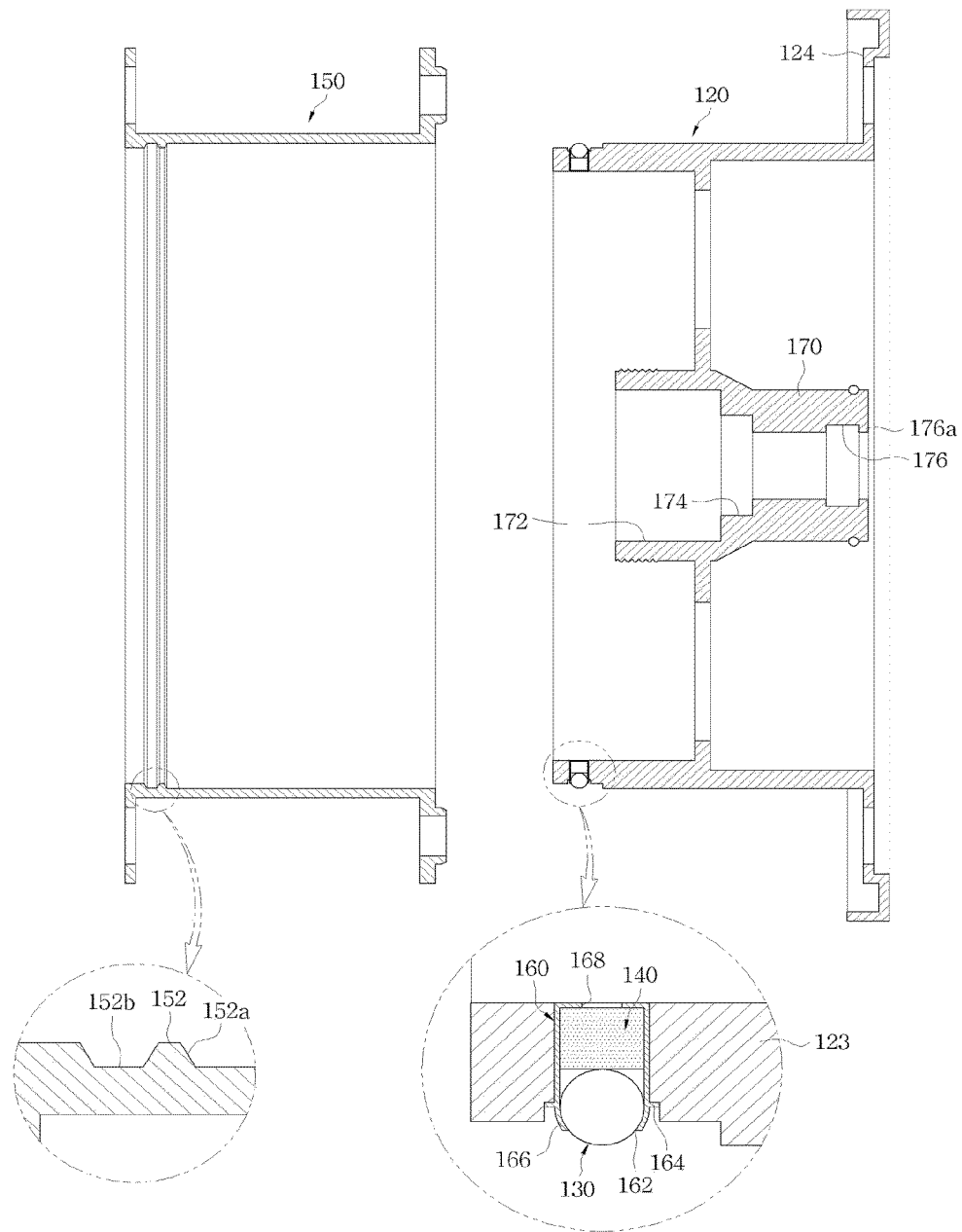
FIGS. 10 and 11 are enlarged cross-sectional views illustrating main parts of the rotary frame and the winding drum shown in FIG. 8 in a process of assembling the winding drum to the rotary frame.
Figure 11:
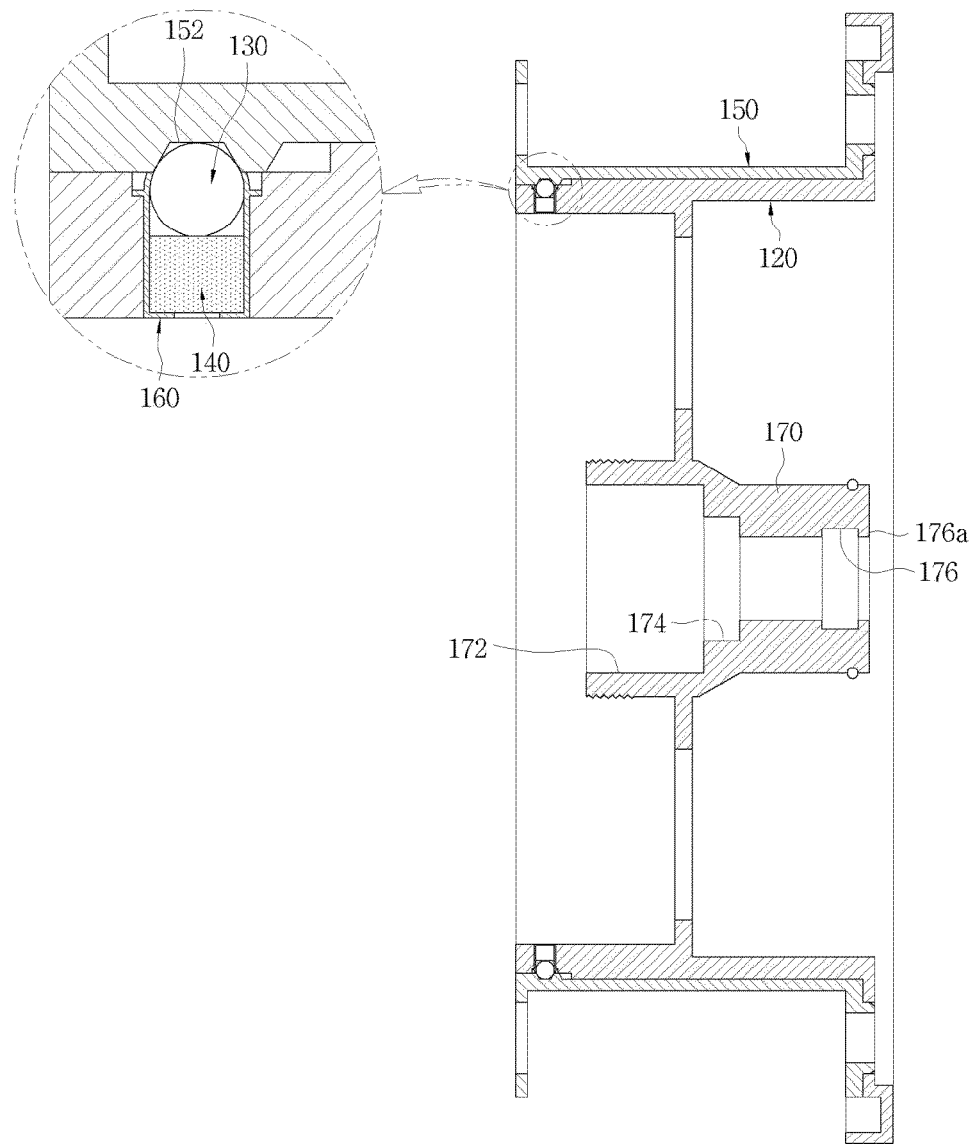
Figure 12:
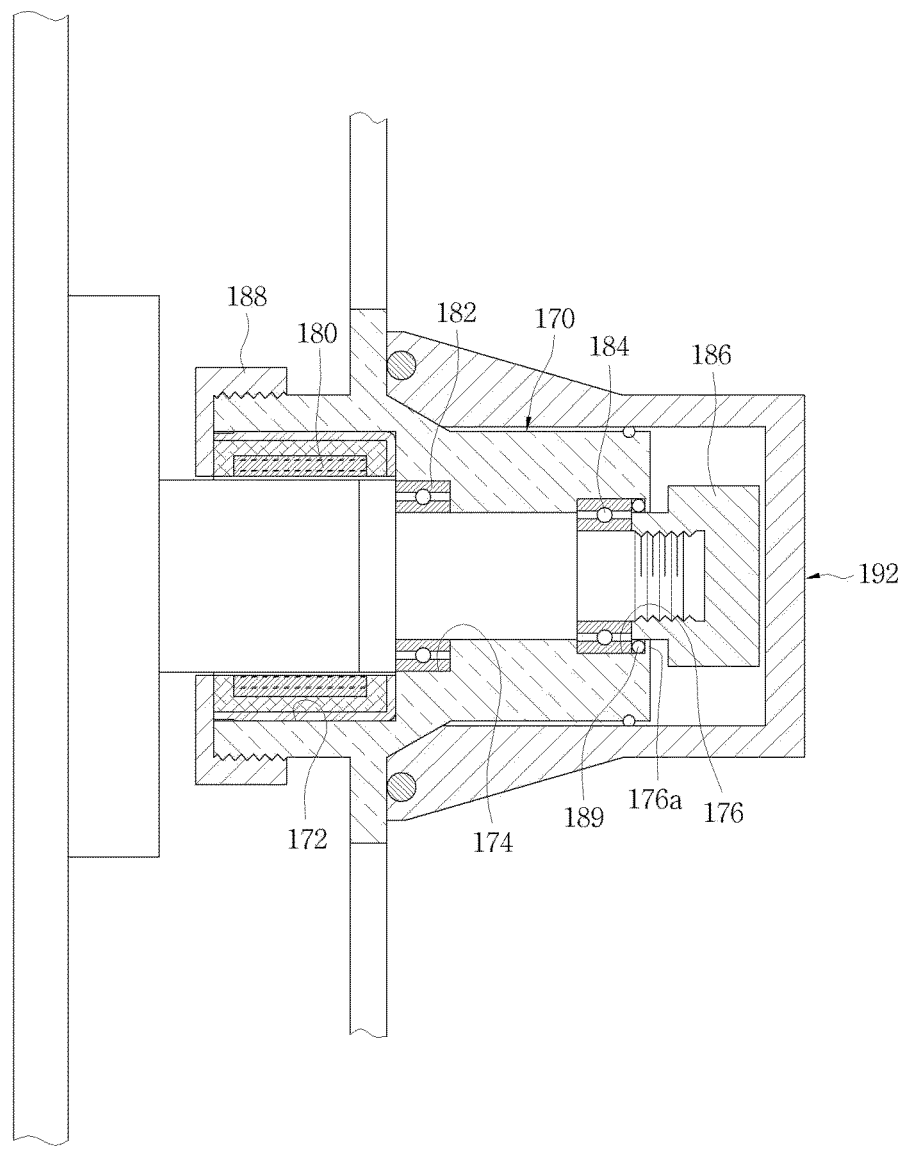
FIG. 12 is a cross-sectional view illustrating the structure of a drag unit, which is another main part of the fly reel shown in FIG. 6.

FIG. 6 is an exploded perspective view illustrating a fly reel having a spool according to another embodiment of the present invention, FIG. 7 is an exploded perspective view illustrating main parts such as a locking ball, an elastic sheet and a housing which are disassembled from a rotary frame of the spool shown in FIG. 6, FIG. 8 is a perspective view of the main parts shown in FIG. 7, i.e. those which are assembled to the rotary frame, FIG. 9 is an assembled perspective view of the rotary frame and the winding drum shown in FIG. 8, FIGS. 10 and 11 are enlarged cross-sectional views illustrating main parts of the rotary frame and the winding drum shown in FIG. 8 in a process of assembling the winding drum to the rotary frame, and FIG. 12 is a cross-sectional view illustrating the structure of a drag unit, which is another main part of the fly reel shown in FIG. 6. As shown in the figures, the fly reel according to this embodiment of the present invention includes a winding drum 150 detachably coupled with a rotary frame 120, locking balls 130 supporting the winding drum 150 to be attached to and detached from the rotary frame 120, and elastic sheets 140 pushing the locking balls 130 using an elastic repulsive force.

The rotary frame 120 is configured with a flange 124 extending radially outwards from the outer circumference of a cylindrical portion 122. In addition, a plurality of spokes 126 are radially formed in the inner circumference of the cylindrical portion of the rotary frame 120, and a drag housing 170 is integrally provided in the central portion of the spokes 126. Specifically, the drag housing 170 is integrally formed in the inner circumference of the rotary frame 120 via the spokes 126.

In the drag unit, the drag housing 170 is integrally formed in the inner circumference of the rotary frame 120 via the spokes 126, and has first, second and third bearing grooves 172, 174 and 176 in the inner circumference thereof. The first, second and third bearing grooves 172, 174 and 176 are formed in order going from the inner side to the outer side. The drag unit also includes one-way, main and auxiliary bearings 180, 182 and 184, which are stored in the first, second and third bearing grooves 176 of the drag housing 170, respectively. In addition, the drag housing 170 is supported by a cap nut 186 coupled with the leading end of a shaft member 112 in the central portion of a frame 110 to thereby prevent the rotary frame 120 from being separated out from the shaft member 112 of the frame 110. The cap nut 186 can be meshed with the leading end of the shaft member of the frame 110. In addition, a retainer 188 is meshed with threads on the outer circumference of the inner end of the drag housing 170 to support and prevent the one-way bearing 180 and the main bearing 182 from being separated from the inner end of the drag housing 170.

A separate spool cap 192 can be coupled with an outer side of the drag housing 170. A packing 171 is used to provide a seal between the outer surface of the drag housing 170 and the spool cap 192. The packing 171 performs a water-proofing function preventing water from penetrating between the spool cap 192 and the drag housing 170. Here, the spool cap 192 can be coupled with the outer surface of the drag housing 170, which is integrated into the rotary frame 120, by for example screwing.

The flange 124 extending radially outwards from the outer circumference of the rotary frame 120 has a plurality of stop holes 124a formed in the circumferential direction. The reference number 120a designates a handle that a user holds with the hand while fly fishing.

A plurality of housing supports 123 are formed on the inner circumference of the rotary frame 120 at regular intervals, and a through-hole 123a into which the housing 160 is fitted is formed in each of the housing supports 123.

The housing 160 is fitted into and coupled with the through-hole 123a formed in the housing support 123 of the rotary frame 120. Here, the diameter of the through-hole 123a of the housing support 123 is smaller than the outer diameter of the housing 160, such that the housing 160 can be securely press-fitted into the through-hole 123a. The outer circumference of the housing 160 can be securely fixed to the through hole 123a by fixing means such as adhesive. The reference numeral 164 designates a catch protrusion ensuring that the housing 160 maintains a coupled position without slipping into the rotary frame 120.

The housing 160 also has a ball protruding-retracting hole 162, and a locking ball 130 and an elastic sheet 140 are disposed inside the housing 160 in the sequence from the ball protruding-retracting hole 162. The ball protruding-retracting hole 162 catches a portion of the locking ball 130 to thereby keep the locking ball 130 from slipping out of the housing 160. Specifically, when the housing 160 is fitted into the through-hole 123a in the housing support 123 of the rotary frame 120, the catch protrusion 164 is caught on the top portion of the inside wall of the through-hole 123a of the housing support 123. Then, in the state where the elastic sheet 140 made of for example silicone having its own elastic restoring force and the locking ball 130 are disposed inside the housing 160, the top portion of the housing 160 can be pressed by a tool to form a dome-shaped ball-supporting portion 166 in the central portion of the housing 160. The ball-supporting portion 166 has the ball protruding-retracting hole 162. Since the locking ball 130 is supported on the ball-supporting portion 166, the locking ball 130 is not separated from the housing 160 but at the same time a portion of the locking ball 130 can protrude from the outer circumference of the rotary frame 120.

The elastic sheet 140 made of an elastic material such as silicone is interposed between the locking ball 130 and the inner space of the housing 160. When the locking ball 130 is pressed, the elastic sheet 140 is also pressed while maintaining a force to elastically restore the original shape. When a force of pressing the locking ball 130 is removed, the elastic sheet 140 elastically forces the locking ball 130 to rebound so that a portion of the locking ball 130 can elastically protrude from the outer circumference of the rotary frame 120. In addition, the housing 160 also has the air hole 168 formed in one end opposite the portion where the locking ball 130 protrudes and retracts. When the elastic sheet 140 is pressed by the locking ball 130, air exits the housing 160 through the air hole 168.

According to the above-described construction of this embodiment of the present invention, when the cylindrical rim 154 of the winding drum 150 is aligned with and pushed into the cylindrical portion 122 of the rotary frame 120, the ball-catching protrusion 152 protruding from the inner circumference of the rim 154 of the winding drum 150 presses the locking ball 130 protruding from the outer circumference of the cylindrical portion 122 of the rotary frame 120. This causes the pressed locking ball 130 to retract into the housing 160, and the elastic sheet 140 made of silicone is compressed to maintain an elastic repulsive force. The winding drum 150 continues to be pushed inwards until the ball-catching protrusion 152 passes completely beyond the locking ball 130. Then, the locking ball 130 elastically restores the original position by its own elastic restoring force from the elastic sheet 140 and is caught by the ball-catching protrusion 152 of the winding drum 150. Thereby, the winding drum 150 is coupled with the rotary frame 120 without being separated therefrom.

As such, in this embodiment of the present invention, the main part elastically holding the locking ball 130 so as to be caught on the ball-catching protrusion 152 of the winding drum 150 is implemented with the elastic sheet 140 made of silicone. The elastic sheet 140 elastically supporting the locking ball 130 has great merits. Specifically, the elastic sheet 140, one of the main parts of the present invention, can be produced by merely cutting an elastic material such as silicone and thus be more easily processed than the coil spring 260. In operation, the elastic sheet 140 is not laterally spread and stuck unlike the coil spring 260, thereby increasing the reliability of operation.

In the meantime, a plurality of the spokes 126 are integrally provided in the inner circumference of the rotary frame 120 and the drag housing 160 is integrally provided in the inner portion of the spokes 126. The one-way bearing 180, the main bearing 182 and the auxiliary bearing 184 are placed inside the drag housing 160 integrally provided in the inner circumference of the rotary frame 120 in order going from the inside to outside of the drag housing 160. A protrusion 176a is also formed in the inner circumference of the leading end of the third bearing groove 176 of the drag housing 170. The protrusion 176a catches a snap ring 189, which in turn keeps the auxiliary bearing 184 from being separated out.

Accordingly, the structure of the drag unit, the main part of this embodiment of the present invention, can be more simply realized and its stability can be further enhanced. Since the drag housing 170, the main part of the drag unit, is integrally provided in the rotary frame 120, manufacturing costs can be reduced as an advantageous effect.

Figure 13:
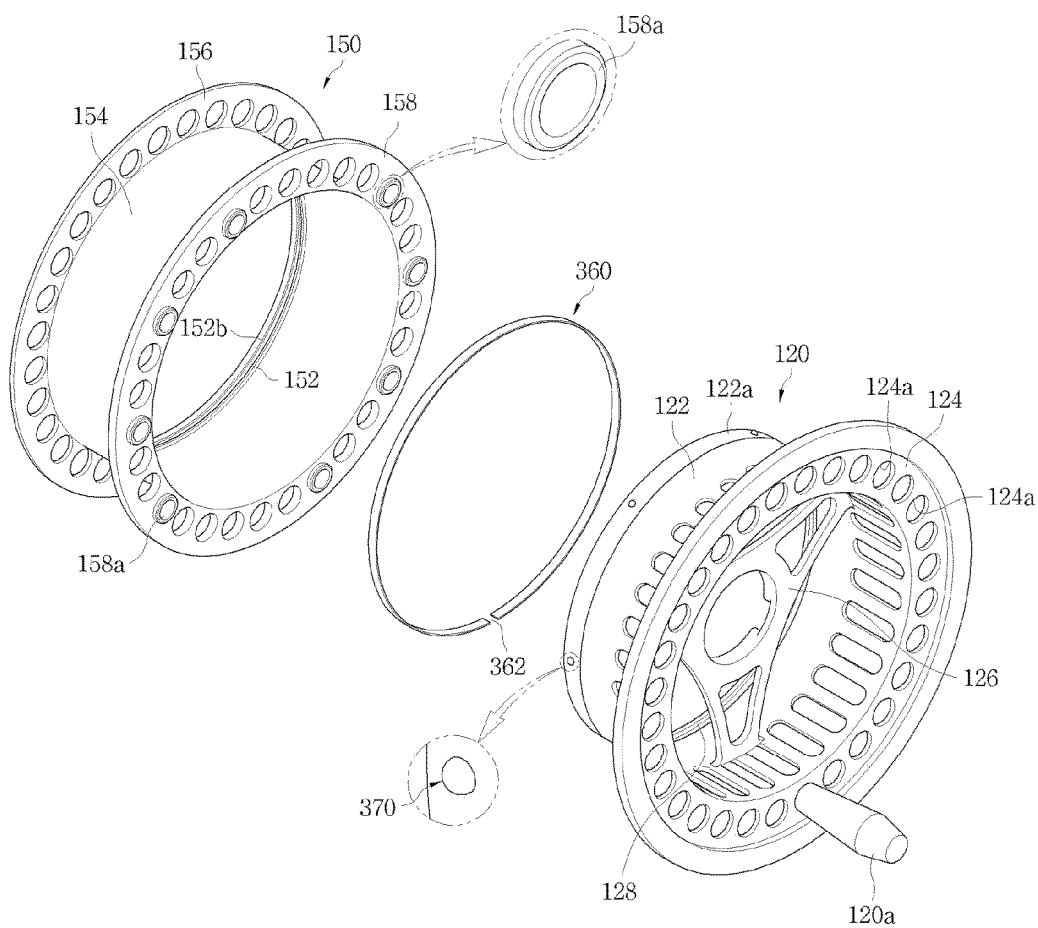
FIG. 13 is an exploded perspective view illustrating a spool according to a further embodiment of the present invention.
Figure 14:
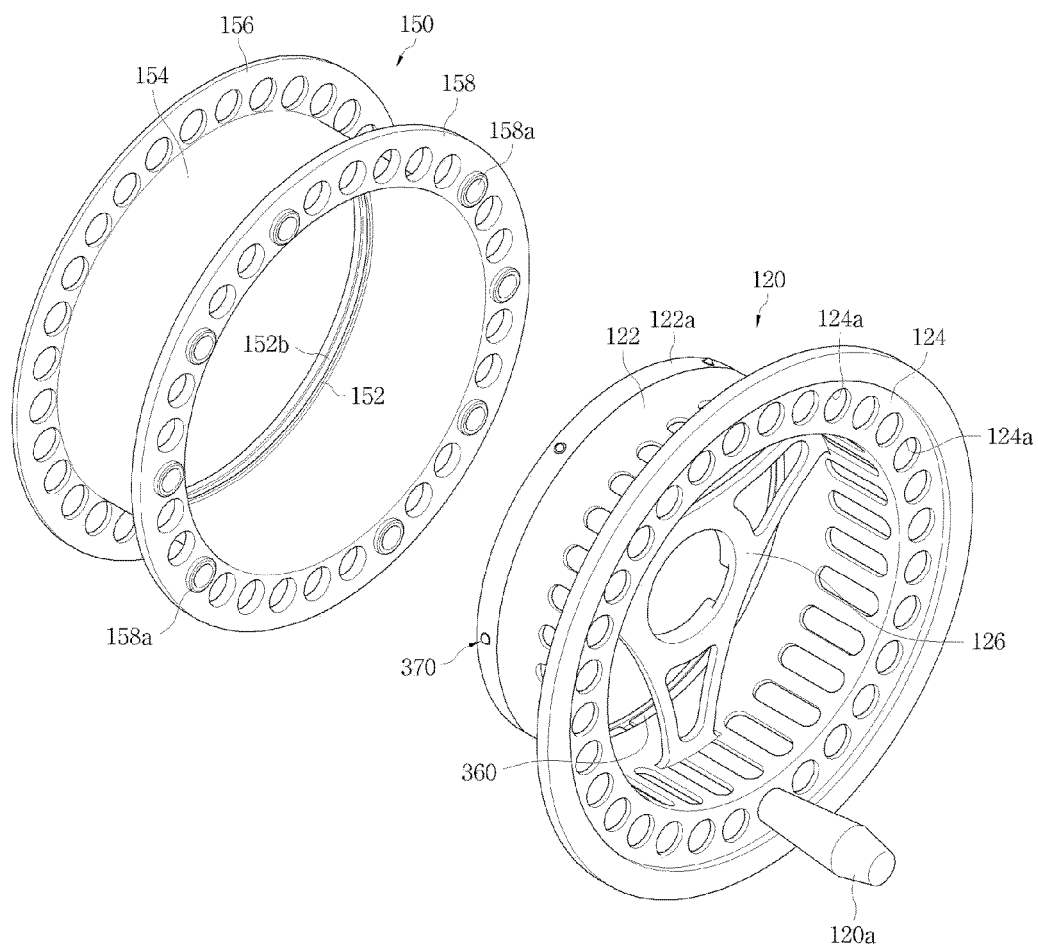
FIG. 14 is an assembled perspective view of the spool shown in FIG. 13, in which an annular spring is coupled to a rotary frame.
Figure 15:
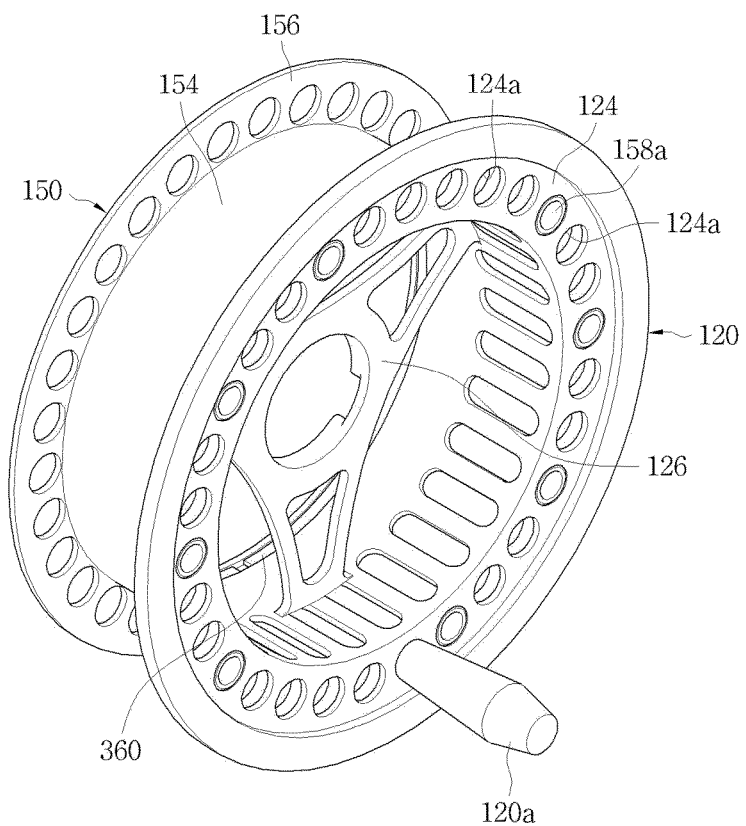
FIG. 15 is an assembled perspective view of main parts of the spool shown in FIG. 13.
Figure 16:
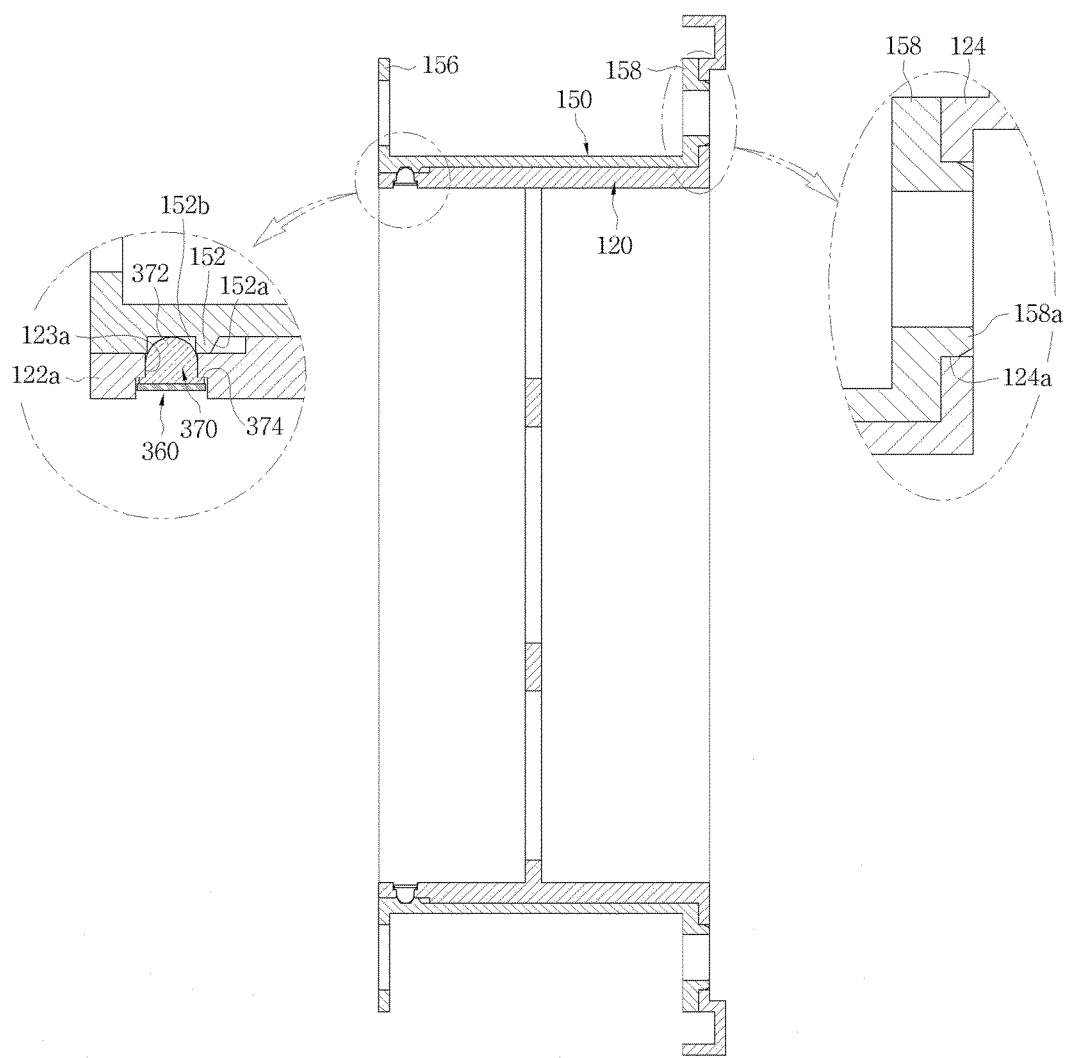
FIG. 16 is a cross-sectional view of main parts of the spool shown in FIG. 13.
Figure 17:
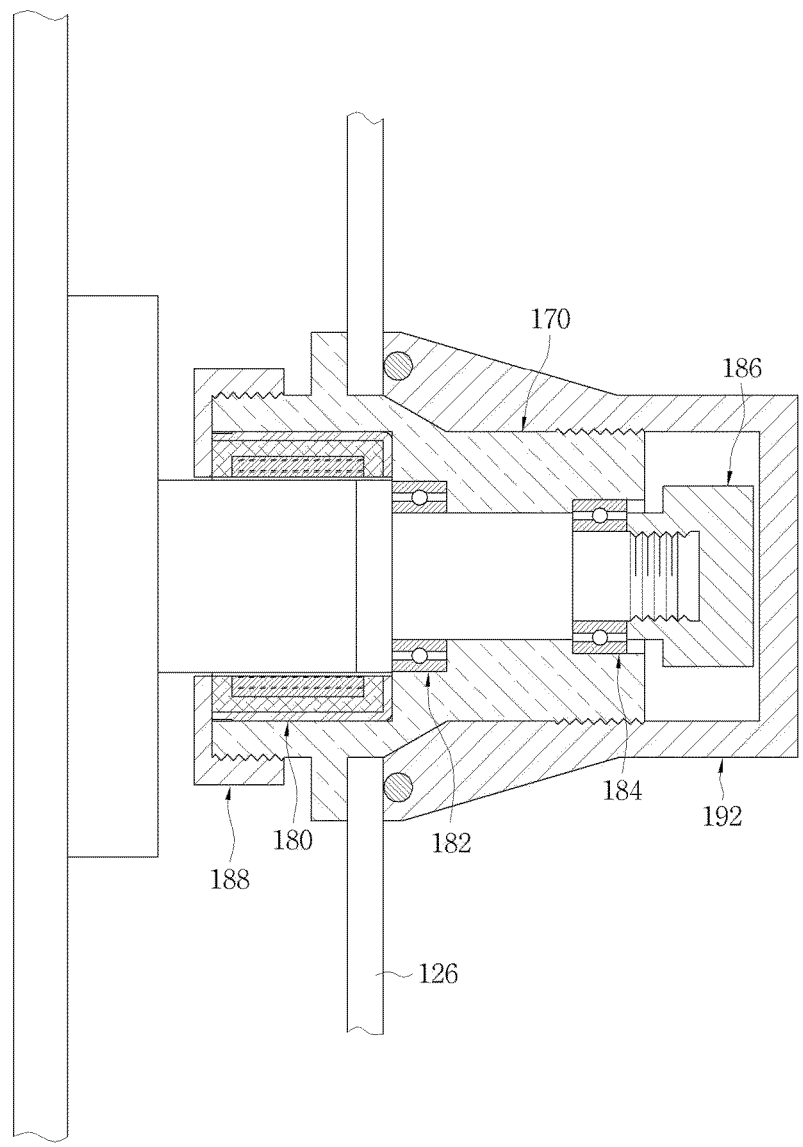
FIG. 17 is a cross-sectional view of a drag unit of the spool shown in FIG. 13.
Figure 18:
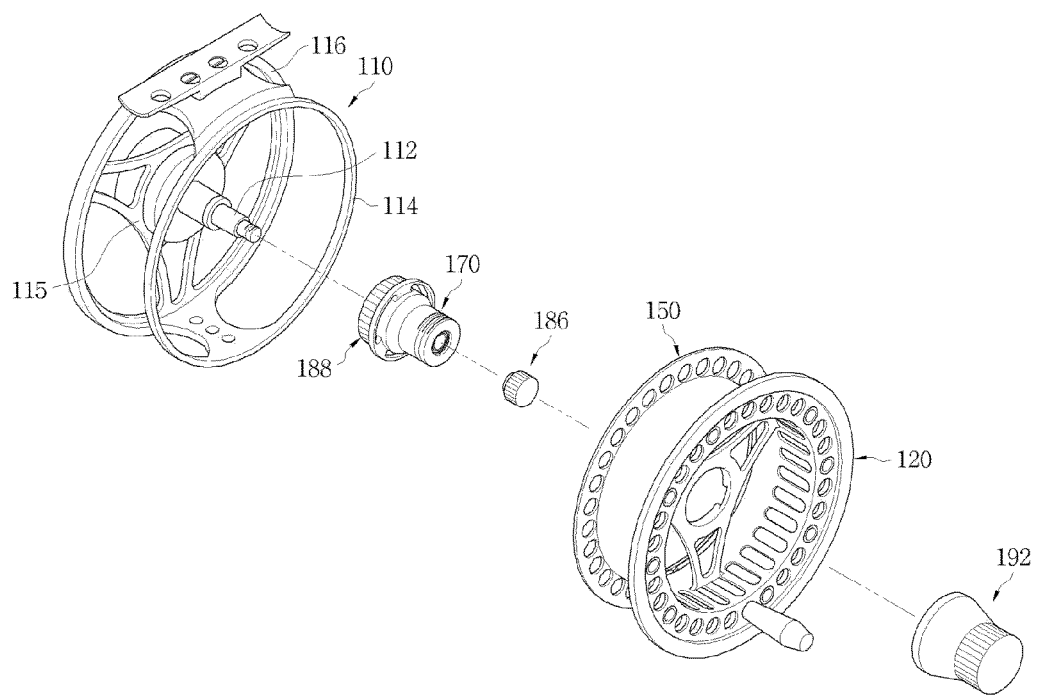
FIG. 18 is an exploded perspective view illustrating a fly reel having the spool shown in FIG. 13.

FIG. 13 is an exploded perspective view illustrating a spool according to a further embodiment of the present invention, FIG. 14 is an assembled perspective view of the spool shown in FIG. 13, in which an annular spring is coupled to a rotary frame, FIG. 15 is an assembled perspective view of main parts of the spool shown in FIG. 13, FIG. 16 is a cross-sectional view of main parts of the spool shown in FIG. 13, FIG. 17 is a cross-sectional view of a drag unit of the spool shown in FIG. 13, and FIG. 18 is an exploded perspective view illustrating a fly reel having the spool shown in FIG. 13. As shown in FIGS. 13 through 18, this embodiment of the present invention includes locking members 370 supporting a winding drum 150 so that the winding drum 150 is not separated from a rotary frame 120, and an annular spring 360 elastically holding the locking members 370.

The rotary frame 120 has a coupling hole in the central portion of spokes 126 thereof, into which a drag housing 170 (a main part of a drag unit) will be fitted. The rotary frame 120 is coupled with the drag unit by coupling keys in the spokes 126 of the rotary frame 120 with keyholes in the outer circumference of the drag housing 170. This configuration prevents the rotary frame 120 from slipping on the outer circumference of the drag unit.

The rotary frame 120 has a flange 124 in one end (i.e., an outer end) of a cylindrical portion 122 and a locking member coupling portion 122a in the other end (i.e., an inner end opposite the outer end). The locking ball coupling portion 122a adjoining the other portions at a stepped portion has a relatively smaller thickness than the other portions do. Through-holes 123a are formed in the inner circumference of the locking member coupling portion 122a at regular intervals.

In addition, the cylindrical portion 122 of the rotary frame 120 has a concave groove 128 in the inner circumferential portion thereof where the through-holes 123a are formed. The annular spring 360 is stably fitted into the concave groove 128 to securely and elastically hold the locking members 370 inside the through-holes 123a.

The winding drum 150 has a ball-catching protrusion 152 configured to catch the locking members 370 thereon. Specifically, the annular ball-catching protrusion 152 is formed in the inner circumference of the cylindrical rim 154 of the winding drum 150, in positions adjacent to an inner end flange 156. The ball-catching protrusion 152 protrudes radially outwards from the inner circumference of the cylindrical rim 154. The ball-catching protrusion 152 has a concave locking groove 152b formed in one portion thereof, into which a corresponding one of the locking members 370 can be fitted.

The winding drum 150 is detachably coupled with the rotary frame 120 via the locking members 370 and the annular spring 360. Specifically, the locking members 370 and the annular spring 360 allow the winding drum 150 to be attached to and detached from the rotary frame 120 by one touch.

Each of the locking members 370 has a domed upper portion 372 in the upper end and a catch protrusion 374 in the lower end. In the inner circumference of the rotary frame 120, the locking member 370 is coupled with a corresponding one of the through-holes 123a such that the domed upper portion 372 of the locking member 370 protrudes from the outer circumference of the rotary frame 120 and the catch protrusion 374 in the lower end of the locking member 370 catches the side wall of the through-hole 123a to prevent the locking member 370 from being separated from the rotary frame 120.

The annular spring 360 is fabricated by shaping a steel strip having elasticity into an annular structure. In this embodiment of the present invention, the annular spring 360 is produced by coiling a strip of spring steel. The annular spring 360 has a cut portion 362 forming opposite ends thereof, such that the opposite ends can shrink inwards. As described above, the annular spring 360 can be stably fitted into the concave groove 128 formed in the inner circumference of the cylindrical portion 122 of the rotary frame 120 to securely and elastically hold the locking members 370 fitted into the through-holes 123a. In a resting position, the spring 260 elastically holds the locking members 370 to elastically protrude from the outer circumference of the frame 120. Since the thickness of the locking ball coupling portion 122a of the rotary frame 120 is smaller than the other portions of the locking ball coupling portion 122a, the upper end of the locking members 130 protruding from the outer circumference of the rotary frame 120 is at the same level as the top surface of other portions.

According to this embodiment of the present invention having the above-described construction, when the rim 154 of the winding drum 150 is aligned with and pushed into the cylindrical portion 122 of the rotary frame 120, the ball-catching protrusion 152 protruding from the inner circumference of the rim 154 of the winding drum 150 presses the locking members 370, which in turn press the annular spring 360 inwards to ensure an elastic repulsive force. The winding drum 150 continues to be pushed inwards until the ball-catching protrusion 152 passes completely beyond the locking members 370. Then, the locking members 370 restore the original position by the elastic repulsive force of the annular spring 360 and are caught by the ball-catching protrusion 152 of the winding drum 150. Thereby, the winding drum 150 is coupled with the rotary frame 120 without being separated therefrom.

As such, in this embodiment of the present invention, the main part elastically holding the locking members 370 is implemented with the annular spring 360. An assembly operation is more simplified and convenient since the annular spring 360 can be assembled to the rotary frame 120 by being fitted into the concave groove 128 in the inner circumference of the cylindrical portion 122 of the rotary frame 120. The annular spring 360 is pressed to shrink due to the cut portion 362 between the opposite ends shrinking, and the shrunk annular spring 360 is fitted into the concave groove 128 in the inner circumference of the cylindrical portion of the rotary frame 120. Then, the annular spring 360 restores the original diameter due to its own elastic force to be securely coupled with the concave groove 128 of the rotary frame 120. As an advantageous effect, the action of elastically holding the locking members 370 can be performed more easily and rapidly.

Since the annular spring 360 is configured with a strip having a linear cross section, the height of the locking members 370 protruding from the outer circumference of the cylindrical portion 122 of the rotary frame 120 can be more easily adjusted by changing the thickness of the annular spring.

The present invention also provides a fly reel including the rotary frame 120 and the winding drum 150 as described above. The fly reel of the present invention includes the frame 110, the rotary frame 120, the winding drum 150, the locking members 370 and the annular spring 360. The frame 110 has a shaft member 112 in the central portion thereof, and the rotary frame 120 is rotatably mounted on the shaft member 112 of the frame 110 via the drag unit. The winding drum 150 is coupled with the rotary frame 120 with the ball-catching protrusion 152 formed in the inner circumference thereof and is configured such that a fish line can be wound on or unwound from the outer circumference thereof. The locking members 370 can protrude from and retract into the outer circumference of the rotary frame 120. The annular spring 360 elastically holds the locking members 370 to protrude from the outer circumference of the rotary frame 120 so that the locking members 370 are caught by one touch on the ball-catching protrusion 152 on the inner circumference of the winding drum 150 when the rotary frame 120 is coupled with the winding drum 150.

Figure 19:
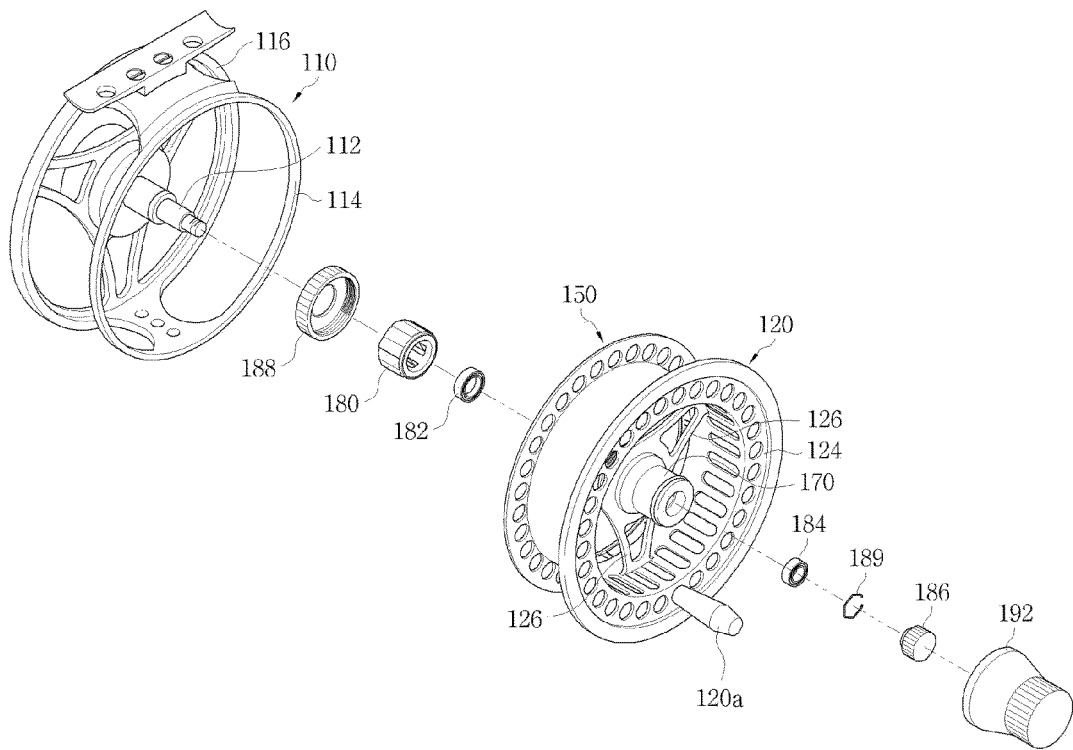
FIG. 19 is an exploded perspective view illustrating a fly reel having a spool according to another embodiment of the present invention.
Figure 20:
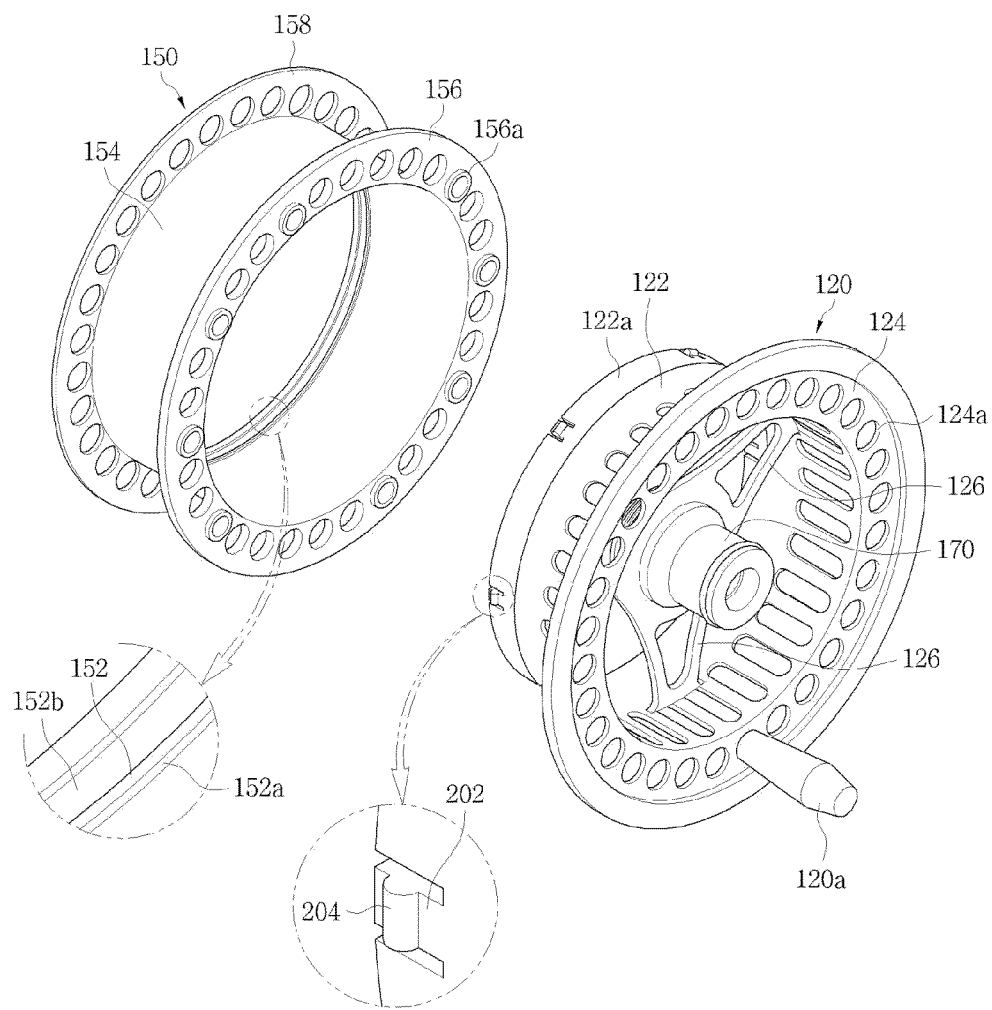
FIG. 20 is an exploded perspective view of main parts such as a rotary frame and a winding drum of the spool shown in FIG. 19.
Figure 21:
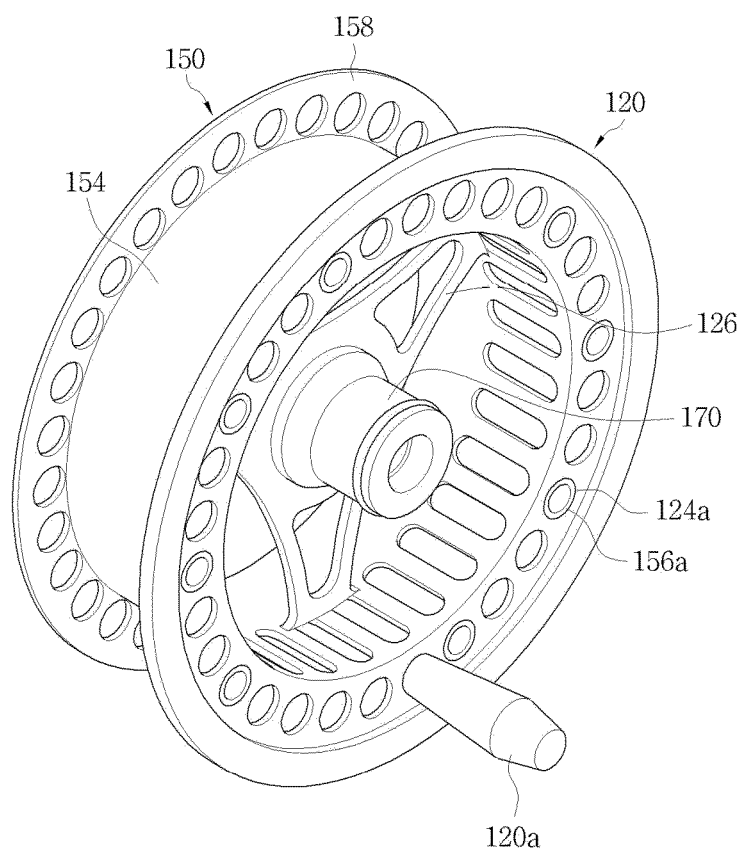
FIG. 21 is an assembled perspective view of the rotary frame and the winding drum shown in FIG. 20.
Figure 22:
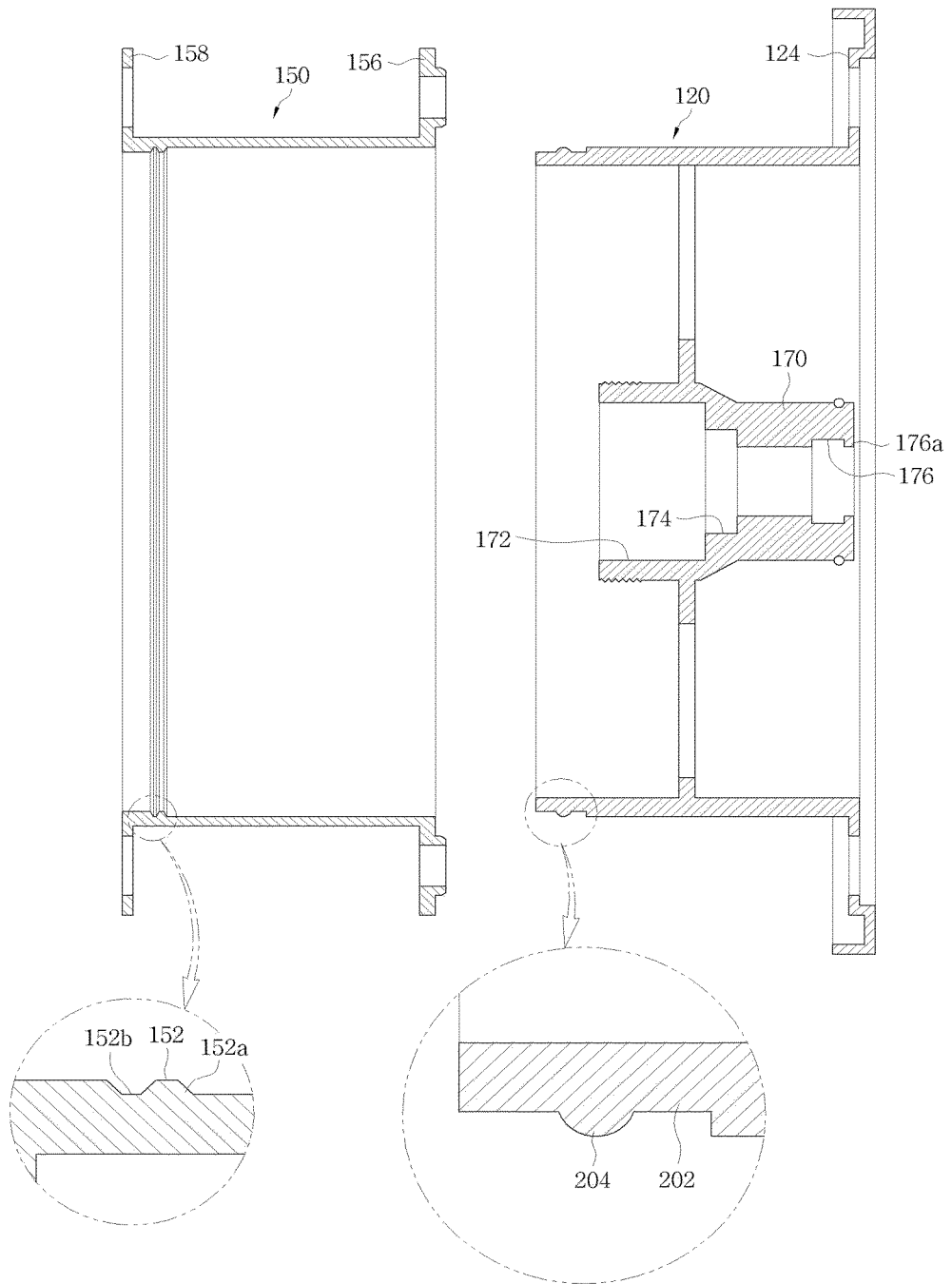
FIGS. 22 and 23 are enlarged cross-sectional views of the main parts shown in FIG. 20 in a process of assembling the winding drum to the rotary frame.
Figure 23:
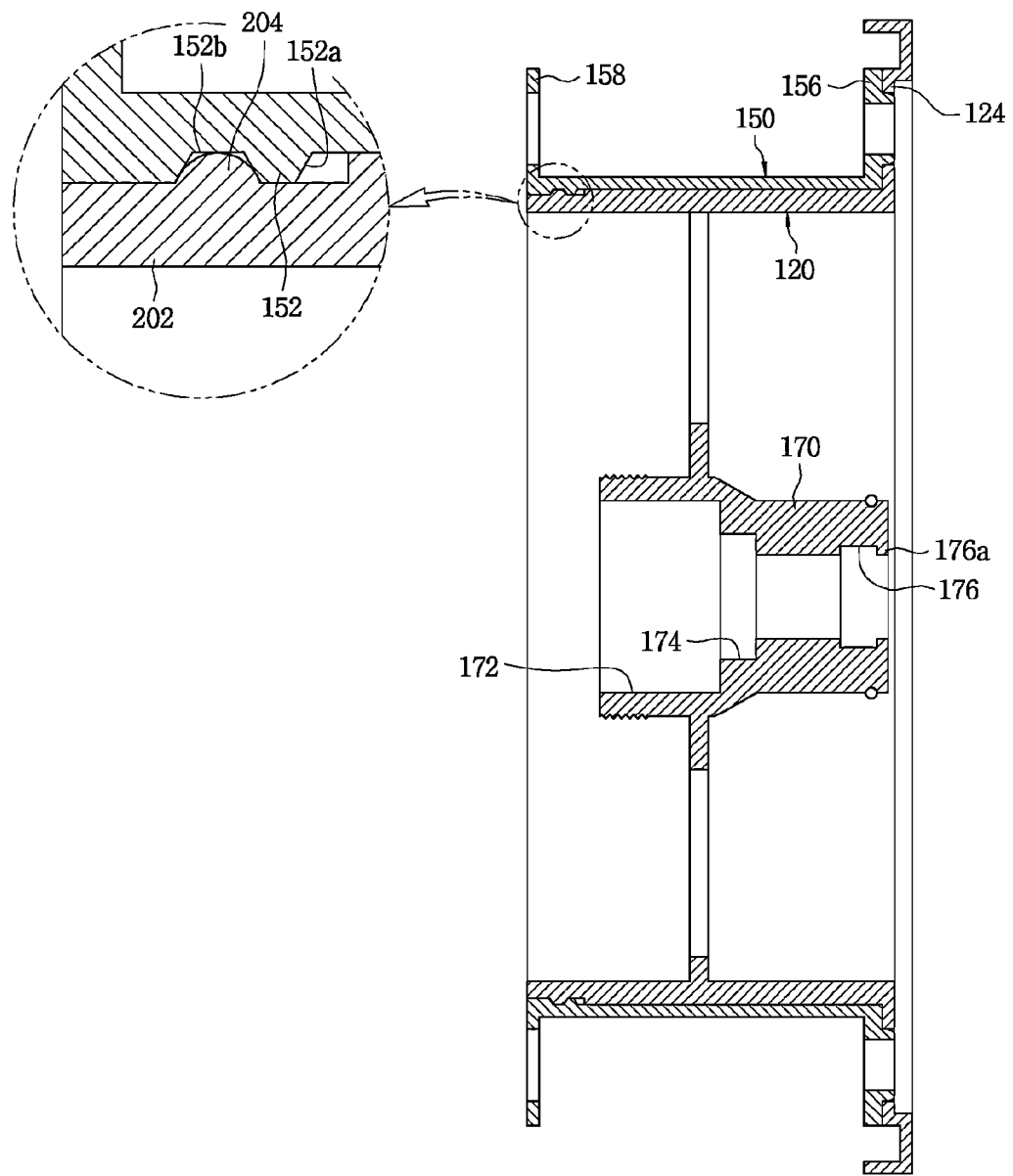
Figure 24:
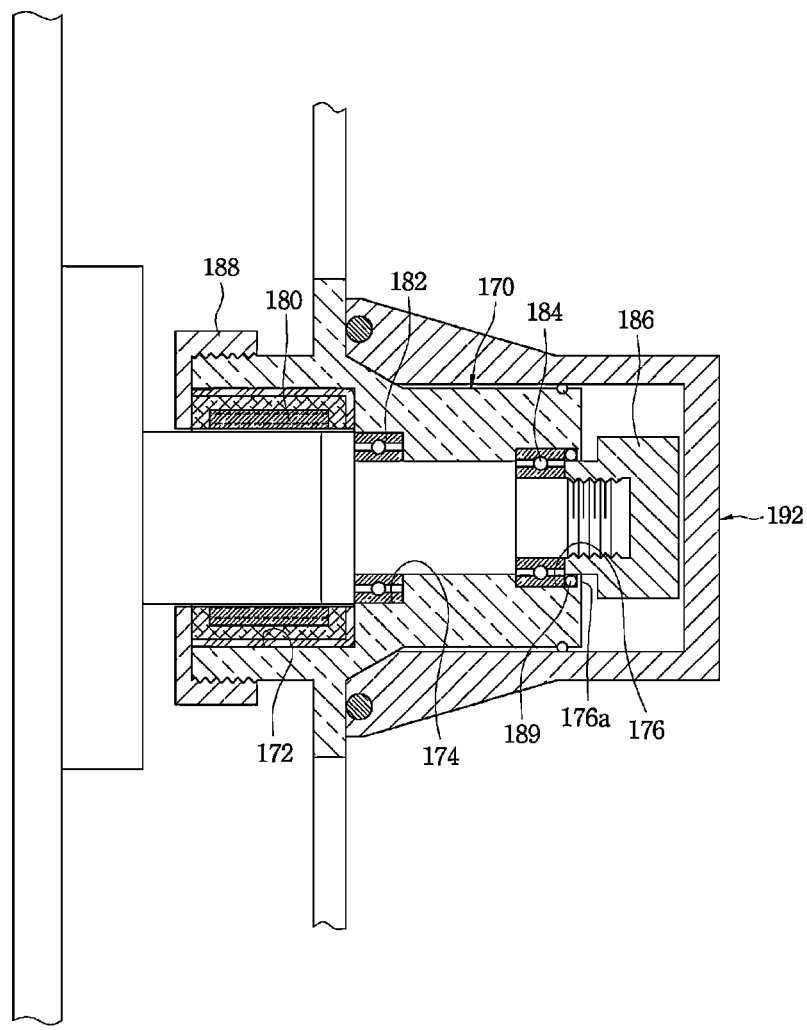
FIG. 24 is a cross-sectional view illustrating the structure of a drag unit, which is another main part of the fly reel shown in FIG. 19.

FIG. 19 is an exploded perspective view illustrating a fly reel having a spool according to yet another embodiment of the present invention, FIG. 20 is an exploded perspective view of main parts such as a rotary frame and a winding drum of the spool shown in FIG. 19, FIG. 21 is an assembled perspective view of the rotary frame and the winding drum shown in FIG. 20, FIGS. 22 and 23 are enlarged cross-sectional views of the main parts shown in FIG. 20 in a process of assembling the winding drum to the rotary frame, and FIG. 24 is a cross-sectional view illustrating the structure of a drag unit, which is another main part of the fly reel shown in FIG. 19. As shown in FIGS. 19 through 24, in this embodiment of the present invention, locking protrusions 204 of locking members 202 formed as integral parts of a rotary frame 120 are caught on a ball-catching protrusion 152 of a winding drum 150.

The drag unit shown in FIGS. 19 through 24 are substantially the same as the drag unit shown in FIGS. 6 through 12, and a repeated description thereof will be omitted.

A cylindrical portion 122 of the rotary frame 120 has a flange 124 integrally formed in the outer circumference thereof. A locking member coupling portion 122a is provided in the inner end of the cylindrical portion 122 with a thickness relatively smaller than other portions. A plurality of the locking members 202 are formed on the locking member coupling portion 122a at regular intervals, and each of the locking members has a locking protrusion 204 on the outer surface thereof. Due to two cuts on opposite edges of the locking member 202, the distal end of the locking member 202 is formed as a free end that can be elastically displaced in the radially inward and outward directions.

Each of the locking protrusions 204 is also configured with an attachment/detachment guide surface 204a, which is inclined or curved to be symmetric with respect to the side cross section of the elastic locking member 202 taken in the transverse direction.

According to this embodiment of the present invention having this construction, when the cylindrical rim 154 of the winding drum is aligned with and pushed into the cylindrical portion 122 of the rotary frame 120, the locking members 202 and the locking protrusions 204 of the rotary frame 120 are pressed by the ball-catching protrusion 152 protruding from the inner circumference of the rim 154 of the winding drum 150 to retract into the rotary frame 120 and at the same time the locking members 202 maintain an elastic restoring force.

The winding drum 150 continues to be pushed inwards until the ball-catching protrusion 152 passes completely beyond the locking protrusions 204 of the locking members 202. Then, the locking members 202 restore the original position and the locking protrusions 204 of the locking members 202 are caught by the ball-catching protrusion 152 of the winding drum 150. Thereby, the winding drum 150 is coupled with the rotary frame 120 without being separated therefrom. In other words, since the locking protrusions 204 extending from the outer circumference of the rotary frame 120 are caught by one touch on the ball-catching protrusion 152 in the inner circumference of the winding drum 150, the winding drum 150 can be attached to and detached from the rotary frame 120 by one touch.

Since each of the locking protrusions 204 is also provided with the attachment/detachment guide surface 204a inclined or curved to be symmetric with respect to the side cross section of the elastic locking member 202 taken in the transverse direction, attachment and detachment can be facilitated by guiding the ball-catching protrusion 152 of the winding drum 150 on the attachment/detachment guide surface 204a of the locking protrusion 204 at the moment when the winding drum 150 is pushed into or pulled out of the rotary frame 120. Operations of coupling and disassembling the winding drum 150 can be more efficiently carried out.

In this embodiment shown in FIGS. 19 through 24, the locking protrusions 204 on the locking members 202 of the rotary frame 120 are configured to be caught on the ball-catching protrusion 152 of the winding drum 150. Since this structure can be produced by machining the rotary frame 120 to have the elastic locking members 202 and machining the elastic locking members 202 to have the locking protrusions 204, it is easier to machine than the coil spring. In addition, the reliability of operation can also be increased since there is no sticking due to lateral spreading of the elastic sheet 140.

Figure 25:
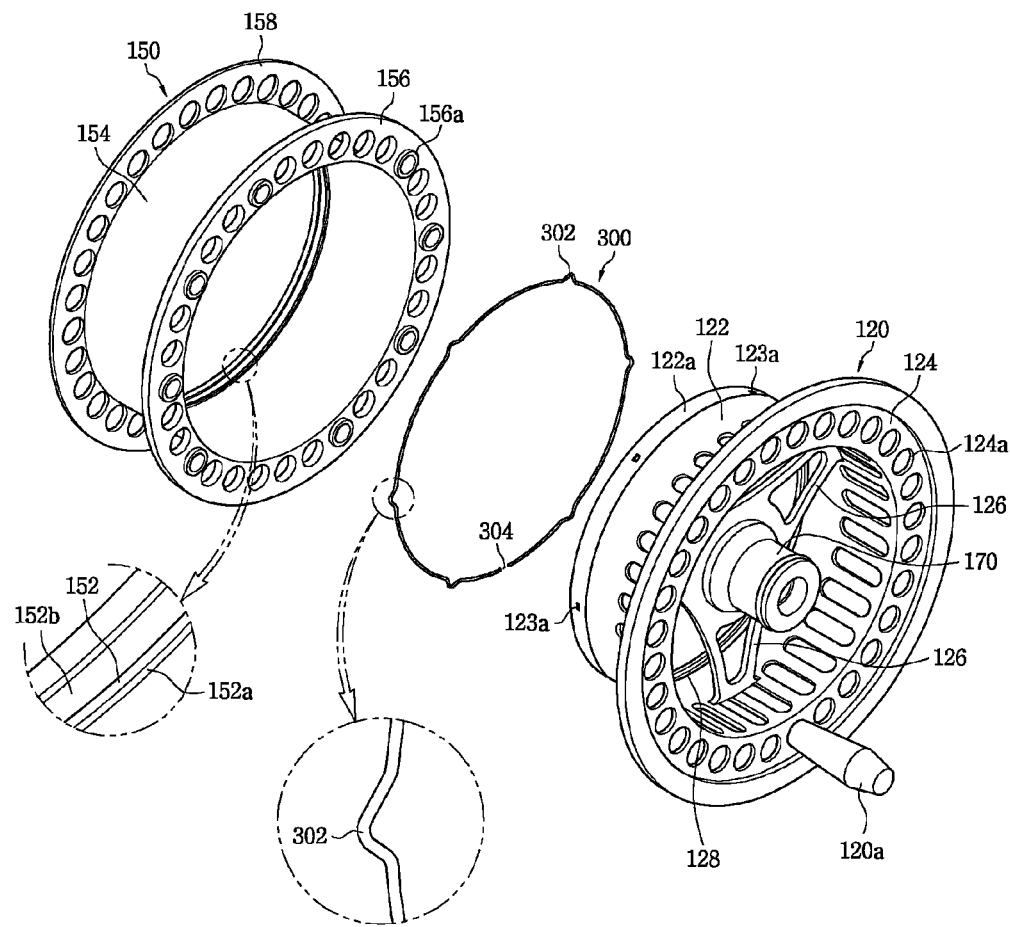
FIG. 25 is an exploded perspective view illustrating a spool according to a yet another embodiment of the present invention.
Figure 26:
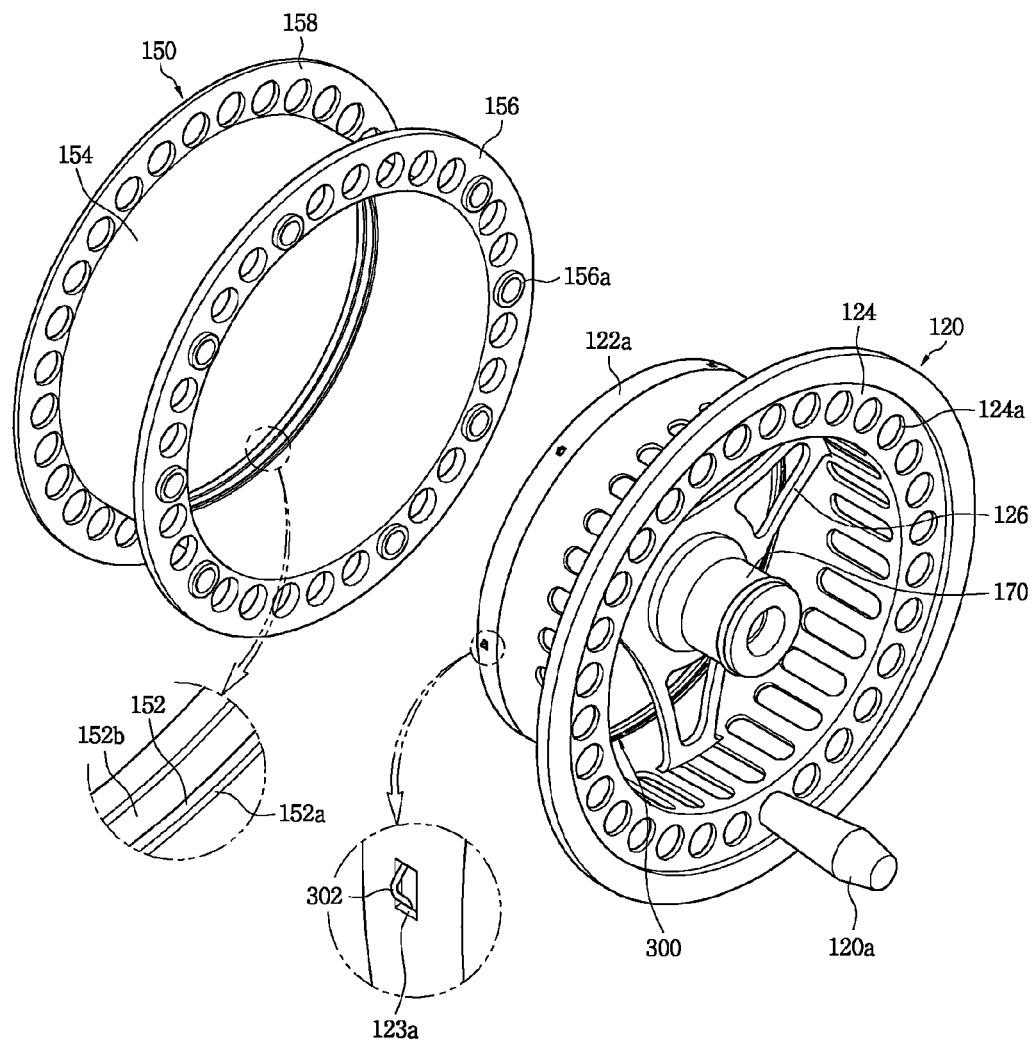
FIG. 26 is an assembled perspective view of the spool shown in FIG. 25, in which an annular spring (a main part of the spool) is coupled to a rotary frame.
Figure 27:
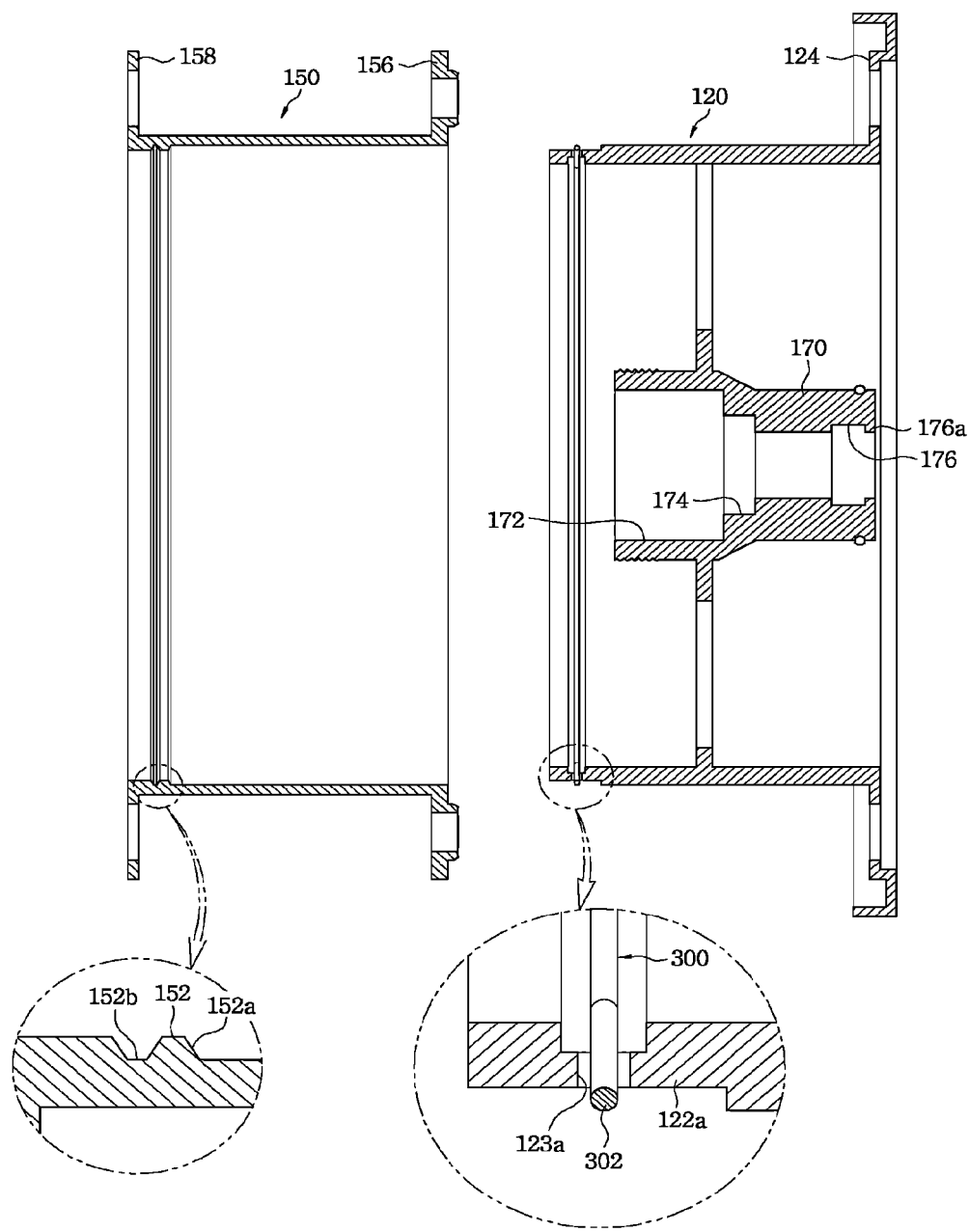
FIGS. 27 and 28 are enlarged cross-sectional views of main parts shown in FIG. 26 in a process of assembling a winding drum to the rotary frame.
Figure 28:
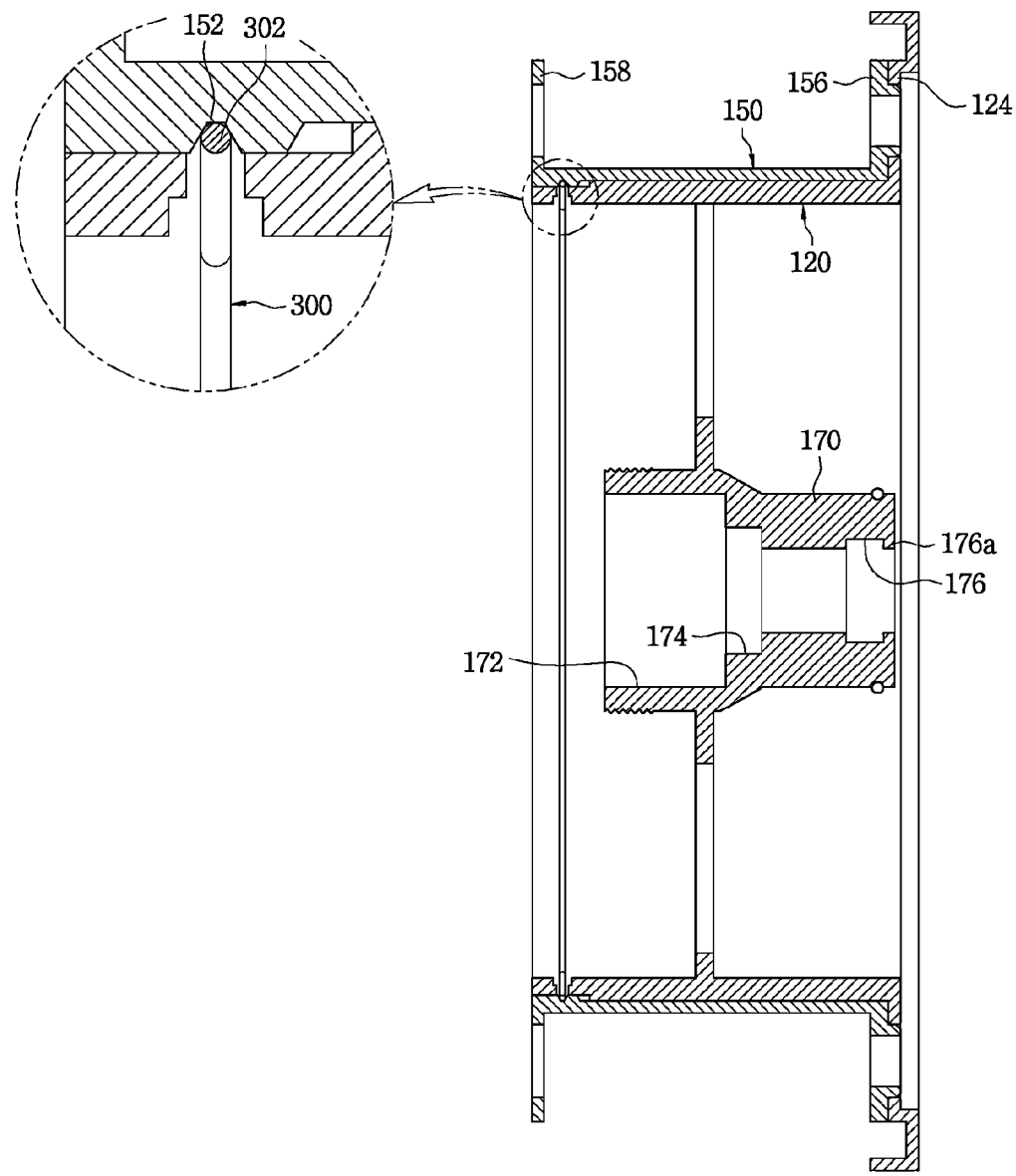
Figure 29:
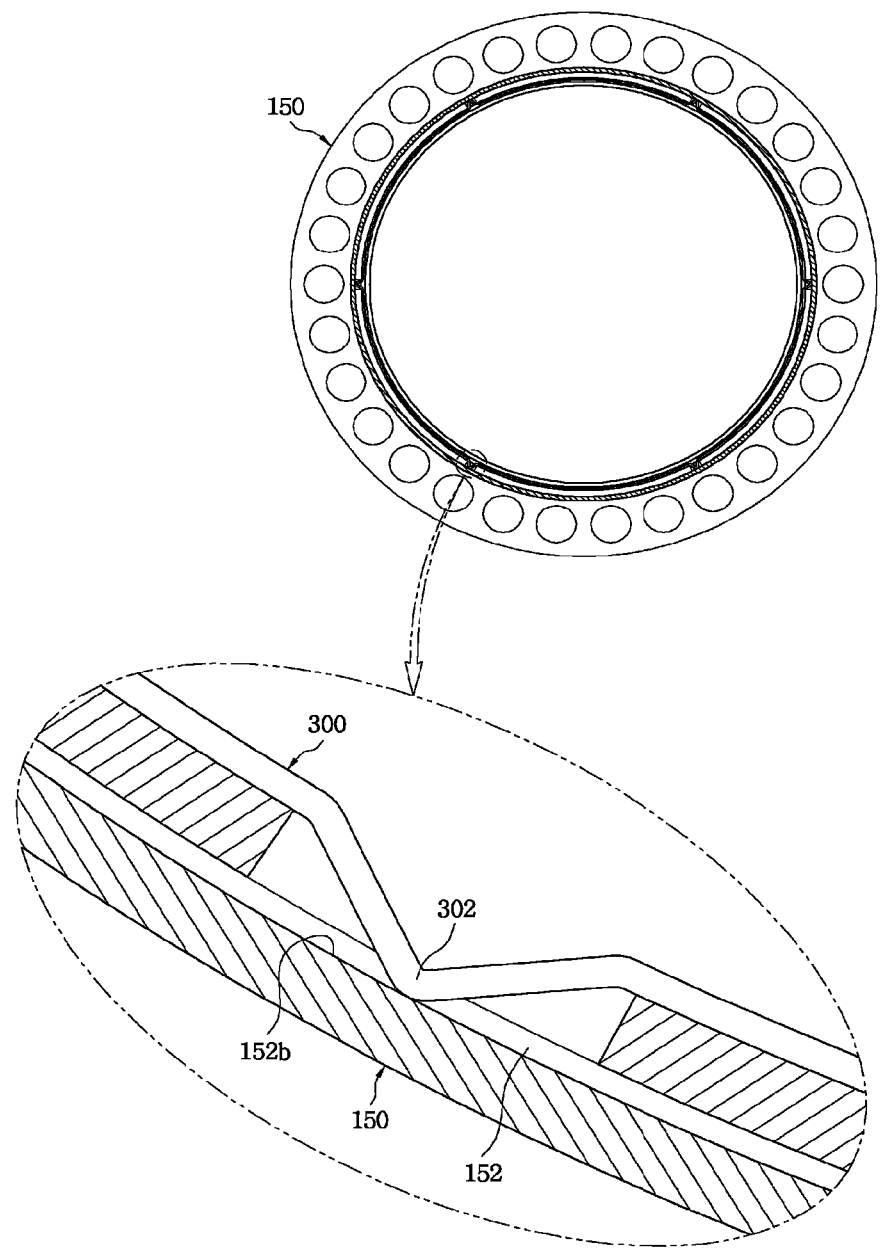
FIG. 29 is an assembled rear view of the winding drum and the rotary frame shown in FIG. 28.

FIG. 25 is an exploded perspective view illustrating a spool according to yet another embodiment of the present invention, FIG. 26 is an assembled perspective view of the spool shown in FIG. 25, in which an annular spring (a main part of the spool) is coupled to a rotary frame, FIGS. 27 and 28 are enlarged cross-sectional views of main parts shown in FIG. 26 in a process of assembling a winding drum to the rotary frame, and FIG. 29 is an assembled rear view of the winding drum and the rotary frame shown in FIG. 28. In this embodiment of the present invention as shown in FIGS. 25 through 29, a wire spring 300 has elastic bends 302, which are coupled with the inner circumference of a rotary frame 120 and are caught on a ball-catching protrusion 152 of a winding drum 150.

The drag unit shown in FIGS. 25 through 29 are substantially the same as the drag units shown in FIGS. 6 through 12 and FIGS. 19 through 24, and a repeated description thereof will be omitted.

The ball-catching protrusion 152 for catching the elastic bends 302 of the wire spring 300 are provided in the inner circumference of a cylindrical rim 154 of the winding drum 150. In addition, a concave locking groove 152b is formed in one portion of the ball-catching protrusion 152, and the elastic bends 302 of the wire spring 300 are inserted into and coupled with the locking groove 152b.

The wire spring 300 is produced by bending a single elastic wire, with a plurality of the elastic bends 302 arranged at regular intervals in the circumferential direction of the wire spring 300. The elastic bends 302 can also be simply formed by bending the wire. An annular wire groove 128 is formed in the inner circumference of the cylindrical portion 122 of the rotary frame 120. The annular wire spring 300 is securely fitted into the wire groove 128, and the elastic bends 302 of the wire spring 300 are engaged into through-holes 123a of the rotary frame 120, respectively, such that an upper portion of each elastic bend 302 protrudes from the outer circumference of the rotary frame 120. Specifically, each elastic bend 302 of the wire spring 300 is engaged into a corresponding through-hole 123a formed in the circumferential direction of the rotary frame 120, and the upper portion of the elastic bend 302 partially protrudes from the outer circumference of the rotary frame 120.

According to this embodiment of the present invention having the above-described construction, when the cylindrical rim 154 of the winding drum 150 is aligned with and pushed into the cylindrical portion 122 of the rotary frame 120, the elastic bends 302 of the wire spring 300 are caught on the ball-catching protrusion 152 protruding from the inner circumference of the rim 154 of the winding drum 150 to maintain the coupling between the winding drum 150 and the rotary frame 120. When the winding drum 150 is pulled from the rotary frame 120, the elastic bends 302 of the wire spring 300 are pressed inwards to retract, thereby allowing the winding drum 150 to be separated from the rotary frame 120.

In this embodiment of the present invention, the wire spring 300 can be produced by bending an elastic wire and be simply fitted into the inner circumference of the winding drum 150. Thus, this embodiment can be more easily realized than the foregoing embodiment using the coil spring. In addition, sticking during operation due to lateral spreading of the coil spring can also be prevented.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A fly reel spool rotatably coupled with a frame mounted on a fishing rod to wind a fish line, comprising:
    a rotary frame rotatably coupled inside the frame;
    a winding drum having a ball-catching protrusion on an inner circumference thereof coupling with the rotary frame, wherein the winding drum is configured such that the fish line is wound on or unwound from an outer circumference thereof;
    a locking ball installed in an outer circumference of the rotary frame to protrude from and retract into the rotary frame; and
    elastic means for elastically holding the locking ball so that the locking ball protrudes from the outer circumference of the rotary frame, whereby the locking ball is caught by one touch on the ball-catching protrusion on the inner circumference of the winding drum when the rotary frame is coupled with the winding drum.

2. The fly reel spool according to claim 1, further comprising at least one housing with one open end installed in an inner circumference of the rotary frame,
    wherein the locking ball protrudes from and retracts into the open end of the housing, and
    wherein the elastic means comprises a coil spring interposed between the locking ball and an inner space of the housing, the coil spring elastically holding the locking ball so that the locking ball protrudes from the open end of the housing.

3. The fly reel spool according to claim 2, further comprising:
    a stop hole or stop protrusion formed in an outer end flange of the rotary frame; and
    a stop protrusion or stop hole formed in a flange of one end of the winding drum,
    wherein the winding drum is rotated together with the rotary frame by engagement between the stop protrusion and the stop hole when the winding drum is coupled to the outer circumference of the rotary frame.

4. The fly reel spool according to claim 1, further comprising:
- a stop hole or stop protrusion formed in an outer end flange of the rotary frame; and
- a stop protrusion or stop hole formed in a flange of one end of the winding drum,
- wherein the winding drum is rotated together with the rotary frame by engagement between the stop protrusion and the stop hole when the winding drum is coupled to the outer circumference of the rotary frame.

5. A fly reel spool rotatably coupled with a frame mounted on a fishing rod to wind a fish line, comprising:
- a rotary frame rotatably coupled inside the frame;
- a locking ball coupled with the rotary frame such that a portion of the locking ball protrudes from and retracts into an outer circumference of the rotary frame;
- an elastic sheet provided inside the rotary frame to actuate the locking ball to elastically protrude from the outer circumference of the rotary frame; and
- a winding drum having a ball-catching protrusion on an inner circumference thereof coupling with the rotary frame, wherein the locking ball protruding from the outer circumference of the rotary frame is caught on the ball-catching protrusion.

6. The fly reel spool according to claim 5, wherein the rotary frame has a plurality of through-holes extending from an inner circumference to the outer circumference thereof, the through-holes arranged in a circumferential direction, the spool further comprising:
- housings each coupled with a corresponding through-hole of the rotary frame, the housing having a ball protruding-retracting hole in one end thereof,
- wherein the locking ball is installed inside the housing to protrude from and retract into the ball protruding-retracting hole, and
- wherein the elastic sheet is interposed between the locking ball and an inner space of the housing to elastically hold the locking ball to protrude through the ball protruding-retracting hole in one end of the housing.

7. The fly reel spool according to claim 6, wherein the rotary frame has housing supports protruding from the inner circumference thereof, and
- wherein the housing is fitted into and assembled to the through-hole of a corresponding one of the housing supports.

8. The fly reel spool according to claim 7, wherein the rotary frame has a plurality of spokes integrally formed in the inner circumference thereof,
the spool further comprising:
- a drag housing integrally provided in inner portions of the spokes; and
- one-way, main and auxiliary bearings installed inside the drag housing in sequence from inside to outside.

9. The fly reel spool according to claim 6, wherein the rotary frame has a plurality of spokes integrally formed in the inner circumference thereof,
the spool further comprising:
- a drag housing integrally provided in inner portions of the spokes; and
- one-way, main and auxiliary bearings installed inside the drag housing in sequence from inside to outside.

10. The fly reel spool according to any one of the preceding claim 5, wherein the rotary frame has a plurality of spokes integrally formed in the inner circumference thereof,
the spool further comprising:
- a drag housing integrally provided in inner portions of the spokes; and
- one-way, main and auxiliary bearings installed inside the drag housing in sequence from inside to outside.

* * * * *